(12) United States Patent
Jalasutram et al.

(10) Patent No.: US 11,268,821 B2
(45) Date of Patent: Mar. 8, 2022

(54) POINT OF INTEREST BASED PICKUP COORDINATION SYSTEM

(71) Applicant: Uber Technologies, Inc., San Francisco, CA (US)

(72) Inventors: Srikanth Jalasutram, San Francisco, CA (US); Anurag Arora, Punjab (IN); Needa Jamil, Bihar (IN); Sidharth Raja, Delhi (IN)

(73) Assignee: Uber Technologies, Inc., San Francisco, CA (US)

( * ) Notice: Subject to any disclaimer, the term of this patent is extended or adjusted under 35 U.S.C. 154(b) by 249 days.

(21) Appl. No.: 16/529,092

(22) Filed: Aug. 1, 2019

(65) Prior Publication Data

US 2020/0041301 A1 Feb. 6, 2020

Related U.S. Application Data

(60) Provisional application No. 62/713,477, filed on Aug. 1, 2018.

(51) Int. Cl.
*G01C 21/36* (2006.01)
*G08G 1/00* (2006.01)
*G01C 21/34* (2006.01)

(52) U.S. Cl.
CPC ...... *G01C 21/3611* (2013.01); *G01C 21/3476* (2013.01); *G01C 21/362* (2013.01); *G08G 1/202* (2013.01)

(58) Field of Classification Search
CPC ........ G01C 21/00; G01C 21/26; G01C 21/34; G01C 21/3453; G01C 21/3476; G01C 21/36; G01C 21/3605; G01C 21/3611; G01C 21/362; G08G 1/00; G08G 1/20; G08G 1/202

See application file for complete search history.

(56) References Cited

U.S. PATENT DOCUMENTS 8,200,247 B1 * 6/2012 Starenky ............. G06F 16/9537
455/456.3
2011/0238301 A1 * 9/2011 Lee ........................ G01C 21/20
701/408

(Continued)

*Primary Examiner* — Geepy Pe
*Assistant Examiner* — Michael Allen Brace, Jr.
(74) *Attorney, Agent, or Firm* — Schwegman Lundberg & Woessner, P.A.

(57) ABSTRACT

Systems and methods for coordinating point of interest pickups in a transportation service are provided. In example embodiments, the system detects a location of a device of a user. Responsive to detecting the location of the device of the user, the system automatically determines one or more potential pickup points based on the detected location. A pickup point user interface (UI) that displays one or more potential pickup points based on the detected location is presented on the device of the user without displaying a map. The system receives confirmation of a pickup point from the one or more potential pickup points and receives an indication of a destination. The system then establishes the transportation service based on the confirmed pickup point and the destination. The system can provide user interfaces that display progress of a driver to the pickup point and progress to the destination without displaying a map.

20 Claims, 16 Drawing Sheets

(56) References Cited

U.S. PATENT DOCUMENTS

| | | | | |
|---|---|---|---|---|
| 2011/0313657 | A1* | 12/2011 | Myllymaki | H04W 4/027 |
| | | | | 701/438 |
| 2012/0041675 | A1* | 2/2012 | Juliver | G06Q 30/0283 |
| | | | | 701/465 |
| 2015/0153191 | A1* | 6/2015 | Ma | G01C 21/34 |
| | | | | 701/426 |
| 2015/0312863 | A1* | 10/2015 | Shen | G01C 21/3697 |
| | | | | 455/574 |
| 2016/0366545 | A1* | 12/2016 | Yamasaki | G06F 3/04842 |
| 2017/0357431 | A1* | 12/2017 | Chang | H04W 64/00 |
| 2018/0014161 | A1* | 1/2018 | Warren | H04W 4/023 |
| 2018/0067620 | A1* | 3/2018 | Adler | G01C 21/00 |
| 2018/0080794 | A1* | 3/2018 | Wang | G06F 16/00 |
| 2018/0137204 | A1* | 5/2018 | Zhang | G06F 16/29 |
| 2018/0137373 | A1* | 5/2018 | Rasmusson, Jr. | G06T 7/20 |
| 2018/0357907 | A1* | 12/2018 | Reiley | G01C 21/20 |
| | | | | 701/408 |

* cited by examiner

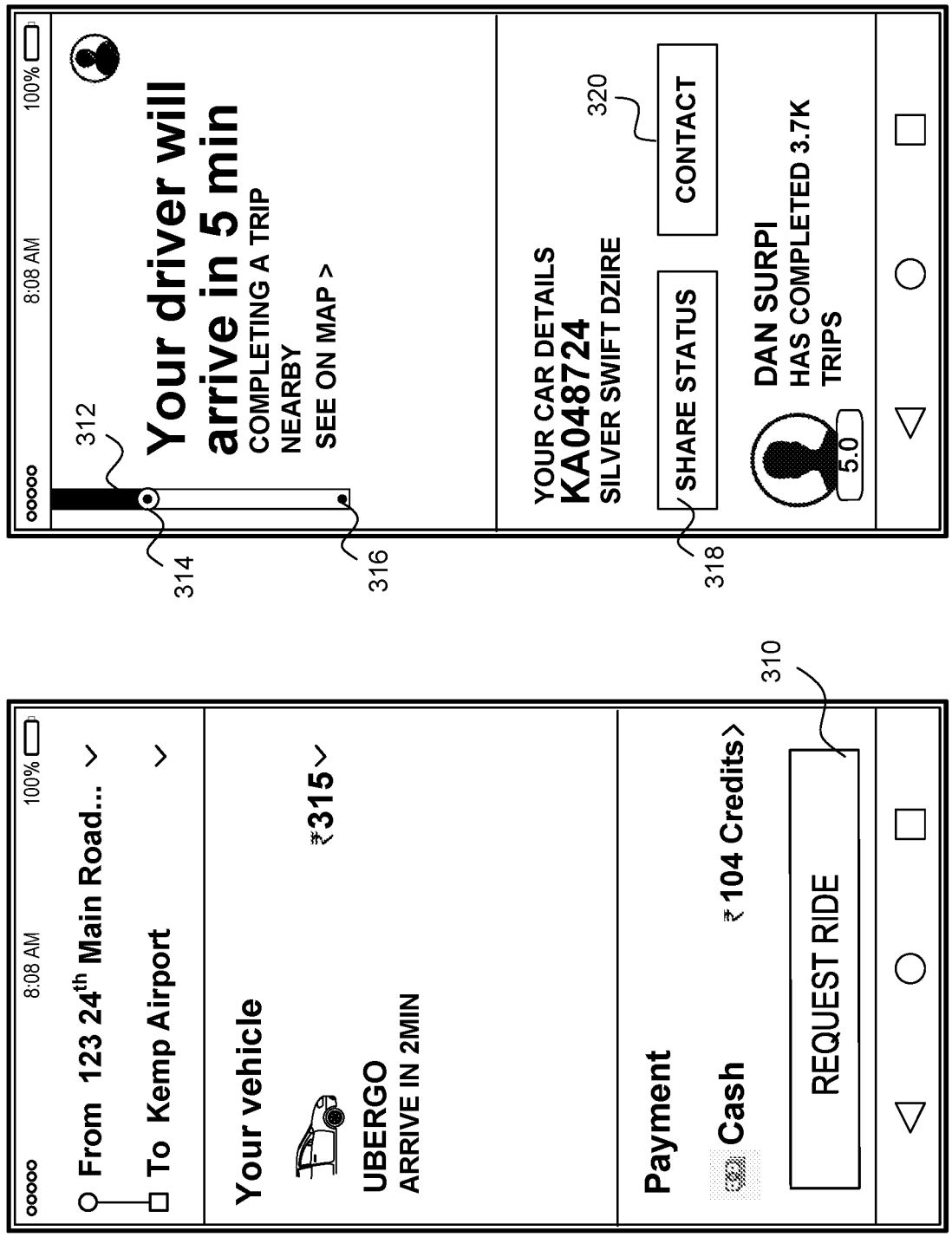

US 11,268,821 B2

POINT OF INTEREST BASED PICKUP COORDINATION SYSTEM

REFERENCE TO RELATED APPLICATIONS

This application claims the priority benefit of U.S. Provisional Patent Application No. 62/713,477 filed Aug. 1, 2018 and entitled "Point of Interest Based Pickup Coordination System," which is incorporated herein by reference in its entirety.

TECHNICAL FIELD

The subject matter disclosed herein generally relates to special-purpose machines configured to facilitate pickup coordination and to the technologies by which such special-purpose machines become improved compared to other machines that coordinate pickup of a user. Specifically, the present disclosure addresses systems and methods that use accuracy of a detected location of a user to determine a point of interest to pick up the user without the use of maps.

BACKGROUND

Typically, when a user of a ride sharing or transportation service inputs their pickup location in a ride sharing application, conventional systems use a global positioning system (GPS) to show the rider's current location on a map graphically displayed on a device of the user. Alternatively, the user may enter an address for their pickup location. However, the display of maps and images on the device of the user requires higher use of bandwidth (and data costs) and more power consumption (e.g., draining battery) than display of less graphically intense data (e.g., text). Additionally, the user may not know an exact address for a location especially if they are unfamiliar with the area or language.

BRIEF DESCRIPTION OF DRAWINGS

Various ones of the appended drawings merely illustrate example embodiments of the present invention and cannot be considered as limiting its scope.

FIG. 3A to FIG. 3H are screenshots of user interfaces illustrating a core flow for coordinating a transportation service, in accordance with one embodiment.

DETAILED DESCRIPTION

Figure 1:
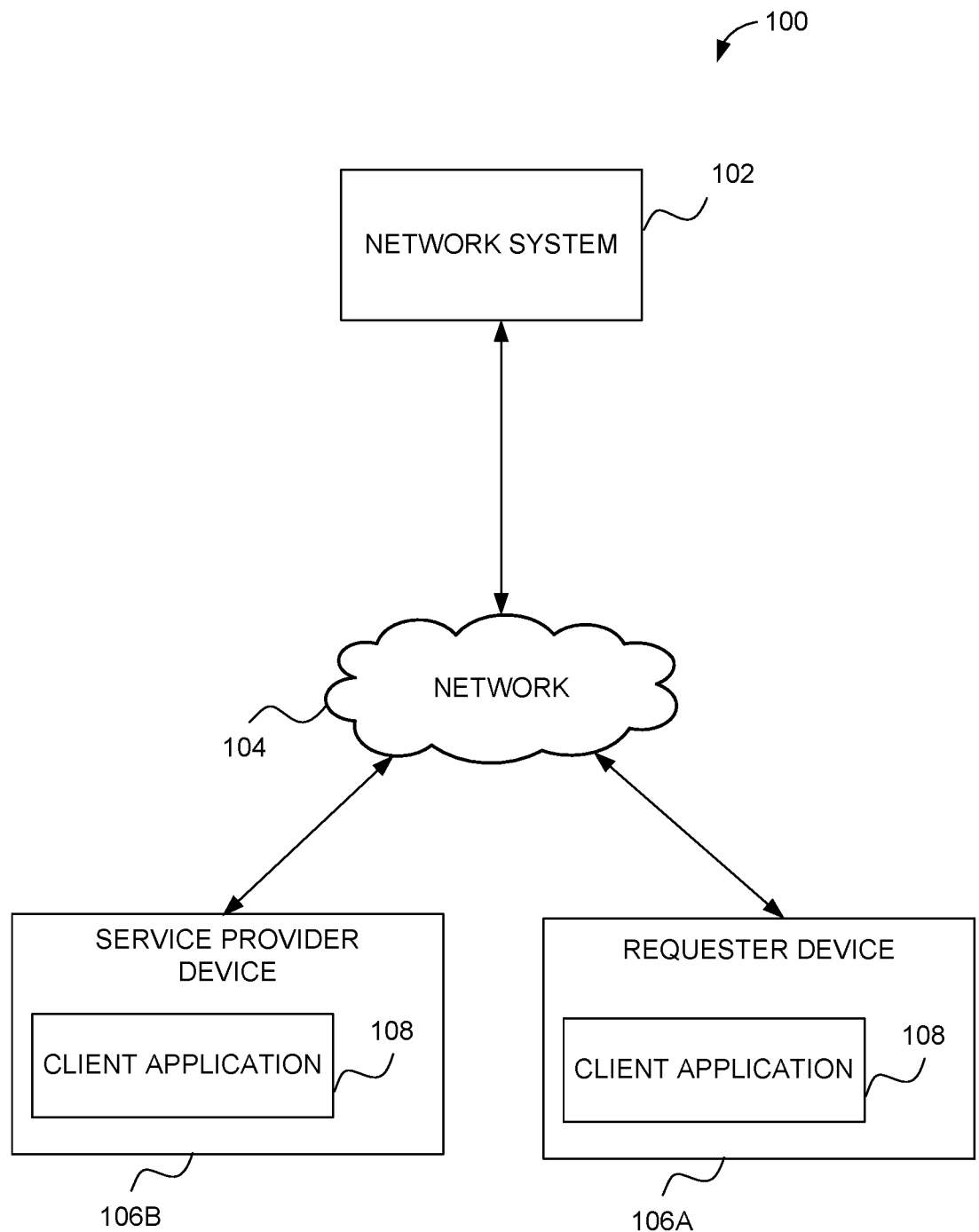
FIG. 1 is a diagram illustrating a networked environment suitable for coordinating pickup and transportation services, in accordance with one embodiment.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

In a transportation service, a driver picks up a rider (or item to be delivery) from a curbside or other location and drops the user (or item) off at their destination, thus completing a trip. In order to establish the transportation service for the rider, the rider, via a ride sharing application, provides a pickup point where the ride sharing service will begin. Conventional systems typically provide a map graphically showing a currently location of a device of the rider and potentially showing nearby pickup points on the map if they are available. However, graphically displaying a map can be data and power intensive. As such, example embodiments provide a network system that operates without the need for maps by showing a textual list of potential pickup points that are based on known points of interests (e.g., store, restaurant) to enables the rider to easily confirm their pickup point. Maps are only displayed if the rider explicitly requests them. The use of points of interests, instead of addresses, also is useful in cases where the rider does not know their precise location or address but can easily identify points of interests (or landmarks) such as restaurants, stores, malls, bus stops, train stations, hospitals, or other named or easily identifiable structures that are around them.

Further still, example embodiments determine an accuracy of a detected location of the device of the rider and uses the accuracy to identify one or more potential pickup points (e.g., points of interests at or near the detected location). Depending on the accuracy, the network system can, for example, select the pickup point for the rider (and the user can just confirm) for very high accuracy level embodiment, present a list of potential pickup points suggested to the rider from which the rider selects for medium to high accuracy level embodiments, request the rider manually input the pickup point for low accuracy level embodiments, or notify the user that their location cannot be detected accurately (e.g., WiFi or location sensor is turned off). By providing the pickup point or a list of potential pickup points that comprise points of interest, the rider can simply use taps on a screen of their device to request a transportation service, which is easier to perform on small screens of a mobile device.

Additionally, the use of points of interest for potential pickup points is useful for a rider that may not be familiar with an area, does not know an address, or is not familiar with the local language.

Additional advantages of example embodiments include use of a previously selected point of interest (e.g., as a previous pickup point or destination of the rider) near a current location of the device of the rider as the pickup point. This may be used, for example, when the accuracy level of the detected location of the device is high. The use of the previous selected point of interest makes it a lot quicker for riders to request a ride. Furthermore, since riders are selecting the best pickup points around an area (e.g., city), the network system is essentially crowdsourcing the best pickup points for each location.

Specifically, example embodiments provide example methods (e.g., algorithms) that facilitate coordinating a pickup point that may be based on a point of interest (POI) and an accuracy level of a detected location of the rider, and example systems (e.g., special-purpose machines or devices) are configured to facilitate coordinating a pickup location that may be based on a POI and accuracy of the detected location of the rider. In example embodiments, the networked system can vary a pickup point flow/experience, based on the accuracy level of the detected location of the rider (e.g., based on GPS signal strength, accuracy, confidence) and other factors (e.g., previous selections of POIs).

In terms of technical advantages, example embodiments use far less bandwidth and data than conventional methods that use maps. This reduces costs for data, which are significant in emerging markets, and speeds up a request flow. As such, example embodiments can be used in low bandwidth situations, with low-end devices (e.g., Android devices), and in areas where Internet networks and global positioning system (GPS) are not reliable, as is common in emerging markets. The use of example embodiments also requires less power consumption on the device of the rider since a map is not displayed when requesting the transportation service or enroute during the transportation service.

FIG. 1 is a diagram illustrating a network environment 100 suitable for coordinating pickup and transportation services, in accordance with one embodiment. The network environment 100 includes a network system 102 communicatively coupled via a network 104 to a requester device 106a (e.g., a device of a service requester or rider) and a service provider device 806b (e.g., a device of a driver)—collectively referred to as "user device 106." In example embodiments, the network system 102 comprises components that arrange, manage, and analyze transportation services including determining pickup locations or points based on points of interests (POIs) at or near a detected location of a user (e.g., a service requester). The network system 102 may be implemented in a computer system, as described below with respect to FIG. 9. It is noted that the components of the network system 102 that provide the operations of a POI-based pickup system are non-native to a generic computer system, and specially configure the generic computer system to operate in a manner to provide the POI-based pickup system.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the network system 102 through a client application 108 stored thereon. The client application 108 of the user devices 106 allow for exchange of information with the network system 102 via user interfaces and may be downloaded from the network system 102. The client application 108 running on the user devices 106 may also determine location information of the user devices 106 (e.g., latitude and longitude for a pickup or a drop-off location of a trip) and provide the location information during the transportation service to the network system 102 for storage as part of trip data. In some embodiments, the components of the client application 108 provide some functionalities that are described herein as occurring at the network system 102 and vice-versa.

In example embodiments, a user or service requester operates the requester device 106a that executes the client application 108 to communicate with the network system 102 to make a request for transportation service (also referred to as a "trip"). In some embodiments, the client application 108 or network system 102 determines or allows the user to specify a pickup point or location and to specify a drop-off location (also referred to as a "destination") for the trip. For example, the pickup point or the drop-off location may be an address or name of a POI determined by the client application 108 or the network system 102 or inputted by the user on a user interface provided via the client application 108. The pickup point determined by the client application or network system 102 may correspond to a current location of the requester device 106a (e.g., automatically determined by a location determination module in the requester device 106a (e.g., a global positioning system (GPS) component)) or nearby POI (e.g., within walking distance). In some embodiments, the network system 102 recommends the pickup location or drop-off location based on historical trip data associated with the user of the requester device 106a (e.g., a POI previously selected as a pickup location or drop-off location). In some embodiments, the client application 108 provides a current location (e.g., coordinates such as latitude and longitude) of the requester device 106a to the network system 102. In some cases, GPS signal strength, accuracy of the current location, and/or a confidence (e.g., confidence level) of the current location is also transmitted to the network system 102. The client application 108 also presents information, from the network system 102 via user interfaces, to the user of the requester device 106a.

A second user (referred to herein as the "service provider") operates the service provider device 106b to execute the client application 108 that communicates with the network system 102 to exchange information associated with providing transportation or delivery service to the user of the requester device 106a. The client application 108 presents information via user interfaces to the user of the service provider device 106b, such as invitations to provide transportation or delivery service and navigation instructions. The client application 108 also provides a current location (e.g., coordinates such as latitude and longitude) of the service provider device 106b to the network system 102, whereby the current location may comprise a pickup location or a drop-off location at a POI (or locations in between enroute between the pickup location and the drop-off location). Depending on implementation, the current location may be a location corresponding to the current location of the service provider device 106b as determined, for example, automatically by a location determination module (not shown) in the service provider device 106b. In example embodiments, the pickup location or the drop-off location corresponds to a POI (or an address of the POI) and are associated with coordinates (e.g., latitude and longitude) based from either a location of the requester device 106a or the service provider device 106b when a trip starts and/or when the trip ends.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 9, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100 (e.g., the user devices 106) or vice-versa. While only a single networked system 102 is shown, alternative embodiments may contemplate having more than one networked systems 102 to perform server operations discussed herein for the networked system 102.

Figure 2:
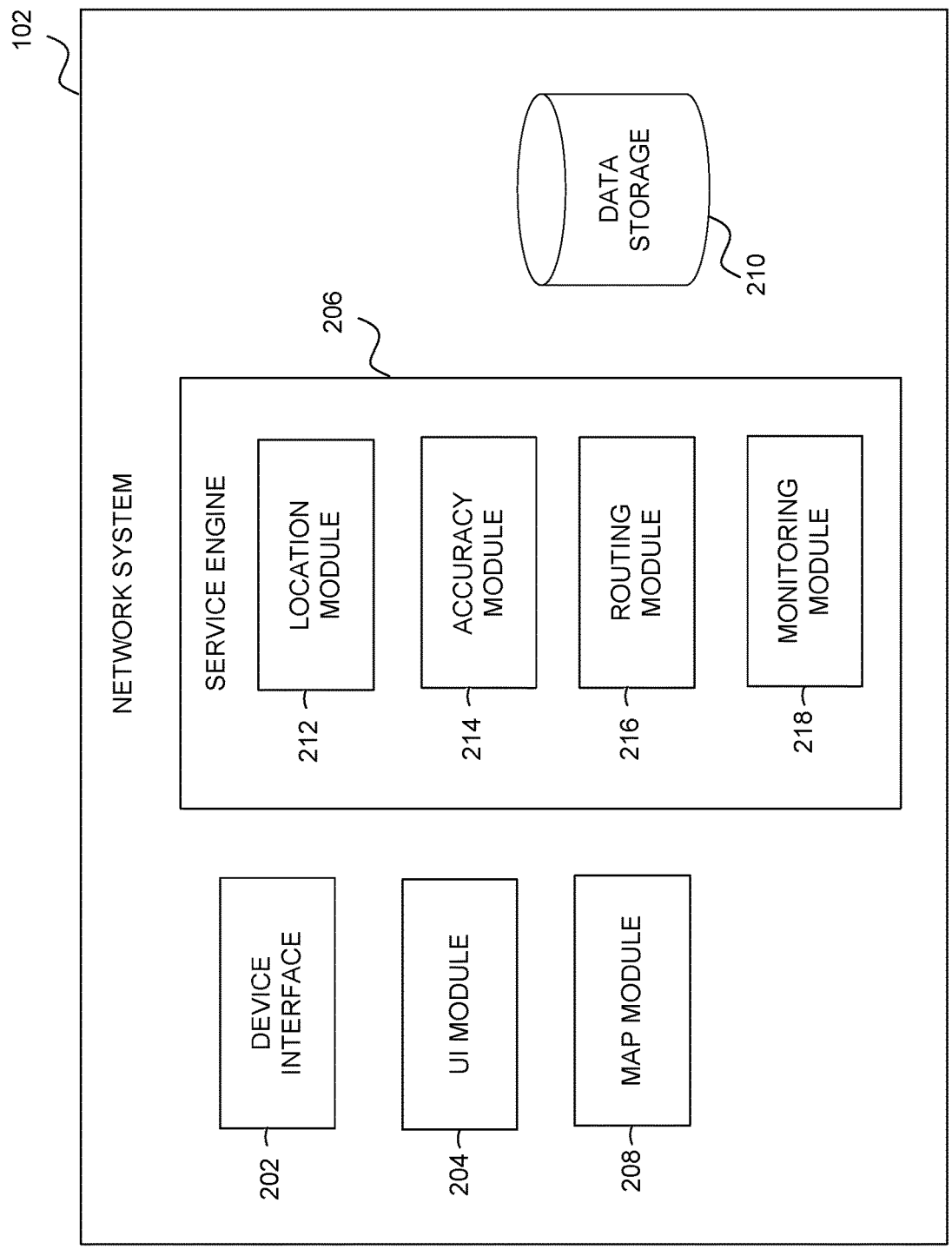
FIG. 2 is a diagram illustrating a network system for coordinating pickup and transportation services, in accordance with one embodiment.

FIG. 2 is a diagram illustrating the network system 102 for coordinating pickup and transportation services, in accordance with one embodiment. The network system 102 manages the determination of a pickup point, arranges the transportation service, and monitors the trip. To enable these operations, the network system 100 comprises a device interface 202, a user interface (UI) module 204, a service engine 206, a map module 208, and a data storage 210 all communicatively coupled to each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components. In some embodiments, some of the functions or components of the network system 102 are located at the client application 108 and vice-versa.

The device interface 202 is configured to exchange data with the user devices 106 and cause presentation of one or more user interfaces generated by the UI module 204 on the user devices 106 including user interfaces that provide potential pickup points from which the user can select or confirm. In some embodiments, the device interface 202 generates and transmits instructions (or the user interfaces themselves) to the user devices 106 to cause the user interfaces to be displayed on the user devices 106. The user interfaces can also be used to request transportation service from the requester device 106a and display navigation instructions and estimated time of arrival (ETA) for the transportation service on both the request device 106a and the service provider device 106b.

The UI module 204 manages generation of user interfaces that are presented, via the client application 108, at the user device 106. In example embodiments, the UI module 204 generates and causes presentation of user interfaces (e.g., sends the UI or instructions to generate the UI via the device interface 202) on the user devices 106. In some embodiments, the UI comprises trip request UIs including UI displaying potential pickup points, potential destination, as well as ETA and navigation UI (e.g., service provider ETA to the pickup point, navigation UI that includes a route for navigating between a current location and the destination).

The service engine 206 manages establishing a transportation service and monitoring of user devices on routes between locations (e.g., a current or pick-up location and a drop-off location). In particular, the service engine 206 determines potential pickup points for the service requester, finds a service provider to transport the service requester to their destination, and monitors ETAs to various locations (e.g., pickup point, destination). To enable these operations, the service engine 206 comprises a location module 212, an accuracy module 213, a routing module 216, and a monitoring module 218.

The location module 212 manages determination of requester device location and pickup points. In example embodiments, the location module 212 receives location data from the client application 108 of the requester device 106a. The location data may indicate, for example, a longitude and latitude of the requester device 106a. The location data may be processed by the location module 212 to determine an address or point of interest (e.g., landmark, venue, store, restaurant) corresponding to the location data (e.g., at the longitude and latitude).

Based on the detected location of the requester device 106a (e.g., address, POI, latitude/longitude), the location module 212 determines potential pickup points that are located at or near the detected location. In some embodiments, the location module 212 works with the accuracy module 214 to identify the pickup points.

Specifically, the accuracy module 214 determines an accuracy level of the detected location and based on that accuracy level, a different set of pickup points (or different pickup user interfaces) can be provided to the user. Each of the accuracy levels are based on predetermined thresholds that may be based on GPS signal strength, accuracy of the GPS, or a confidence (score) for the location. In some embodiments, the GPS signal strength, accuracy, and/or confidence is determined by components of the user device 106a and transmitted to the accuracy module 214.

For example, the accuracy level is very high if the detected location is within a predefined geofence associated with a known location, point of interest, or venue or if the service requester is near (e.g., within the predefined geofence) a predefined pickup or drop-off zone (all collectively referred to herein as the "specific point of interest"). The very high accuracy level may result in the location module 212 selecting the specific point of interest (e.g., the location, point of interest, or venue) as the pickup point. Alternatively, the location module 212 selects specific points within the location, point of interest, or venue as potential pickup points (e.g., floors of a garage, terminals at an airport, exits from a venue). This occurs when the network system 102 has a structured list of dedicated, predefined, or popular (e.g., hotspot) pickup points associated with the location, point of interest, or venue.

A high accuracy level detected by the accuracy module 214 is similar to the very high accuracy level but occurs if the service requester is at a location that they have previously been picked up or dropped off at or in a case where the system knows the user's location to a high accuracy, but the system may not have structured information regarding dedicated, predefined, or popular (e.g., hotspot) pickup points associated with the location. In these embodiments, the location module 212 accesses the data storage 210 to identify (from previous trips) previous pickup or drop-off locations. The previous pickup or drop-off locations may be at or within a predetermined distance of the detected location. The UI module 204 then presents the previous pickup and drop-off location as the pickup point.

For a medium accuracy level, the location module 212 may not know the exact location where the service requester is. In this embodiment, the accuracy module 214 determines that the detected location is accurate to below a predetermined distance threshold (e.g., accurate to within 150 meters). The medium accuracy may be based on GPS accuracy being low, WiFi being turned off, or there being competing points of interests that match the detected location. In this embodiment, the location module 212 identifies the detected location (e.g., as a rough address) and identifies nearby potential pickup points (e.g., pickup or drop-off locations based on other service requesters) that are within walking distance of the detected location. The UI module 204 then presents a list of suggested nearby pickup points from which the service requester can select. The UI module 204 may also provide a field where the service requester can search (e.g., by name) for nearby pickup points.

For a low accuracy level, the location module 212 also does not know exactly where the service requester is located.

In this embodiment, the accuracy module 214 determines that the detected location is accurate to or above a predetermined distance threshold (e.g., accurate to 150 meters or above). The low accuracy may be based on GPS accuracy being low, WiFi being turned off, or there being competing points of interests that match the detected location. In this embodiment, the location module 212 identifies the detected location (e.g., as a rough address) and identifies nearby potential pickup points (e.g., pickup or drop-off locations based on other service requesters) that are within walking distance of the detected location. The UI module 204 then presents a list of suggested nearby pickup points from which the service requester can select, a field where the service requester can search (e.g., by name) for nearby pickup points, and an indication that the GPS signal (or accuracy) is low.

In a no accuracy embodiment, the location sensors (e.g., GPS sensors) are turned off or no location data is obtained from the user device 106a. Based on this determination by the location module 212 or the accuracy module 214, the UI module 204 presents a user interface that indicates and/or provides options to turn on location sensors or to manually enter the location. In an alternative embodiment, the UI module 204 presents an option to call the service requester (e.g., "call me" option) in order to determine their pickup point. This allows the service requester to opt into allowing the driver to contact them over a phone call to coordinate the pickup when GPS cannot be used.

The routing module 216 manages the establishing of the transportation service and routing. In example embodiments, the service requester confirms their pickup point and provides a destination. In some cases, the service requester may also indicate the type of transport they prefer (e.g., small vehicle, large vehicle, taxi, bus). Based on all this information, the routing module 216 identifies matching service providers within a predetermined distance of the service requesters that are available to provide the transportation service. One of the service requesters is then selected and dispatched to the pickup point. The routing module 216 provides a route from the service provider's current location to the pickup point.

The monitoring module 218 monitors progress of the service provider to the pickup point. The progress can then be presented to the user devices 106. In one embodiment, the progress is shown on a UI having a progress bar (which will be discussed in more detail below) that excludes use of a map.

The routing module 216 also determines a route between the pickup point and the destination and presents turn-by-turn navigation instructions along the route. The route and navigation instructions are then presented via the UI module 204 and device interface 202 on the service provider device 106b. In example embodiments, the navigation engine 206 monitors a user traversing the route and captures trip data from the monitoring. The trip data can include locations (e.g., latitude and longitude), speed, time, and whether users followed the suggested routes (e.g., follows the navigation instructions).

The monitoring module 218 also monitors progress along the route to the destination. The progress can then be presented to the user devices 106. In one embodiment, the progress is shown, to the service requester, using a progress bar similar to the progress bar presented for service provider ETA to the pickup point.

The map module 208 manages maps. Maps are provided to the service provider device 106b to enable the service provider to navigate (e.g., turn-by-turn) to the pickup point and to the destination. The service requester can also enable maps on the service requester device 106*a* if desired. In example embodiments, maps are presented to the service requester only if the service requester "turns on" maps. Otherwise, information is displayed in text format or with a progress bar, which is less data and power consumption intensive.

The data storage 210 is configured to store information associated with each user of the networked system 102. The information includes various trip or trace data, which may be used by the networked system 102 to, for example, identify popular pickup points and destinations (sometimes referred to as "hotspots") as well as to identify previous pickup points and destinations for a specific service requester. In some embodiments, the data is stored in or associated with a user profile corresponding to each user and includes a history of interactions using the networked system 102. While the data storage 210 is shown to be embodied within the networked system, alternative embodiments can locate the data storage 210 elsewhere and have the networked system 102 communicatively coupled to the data storage 210.

Figure 3B:
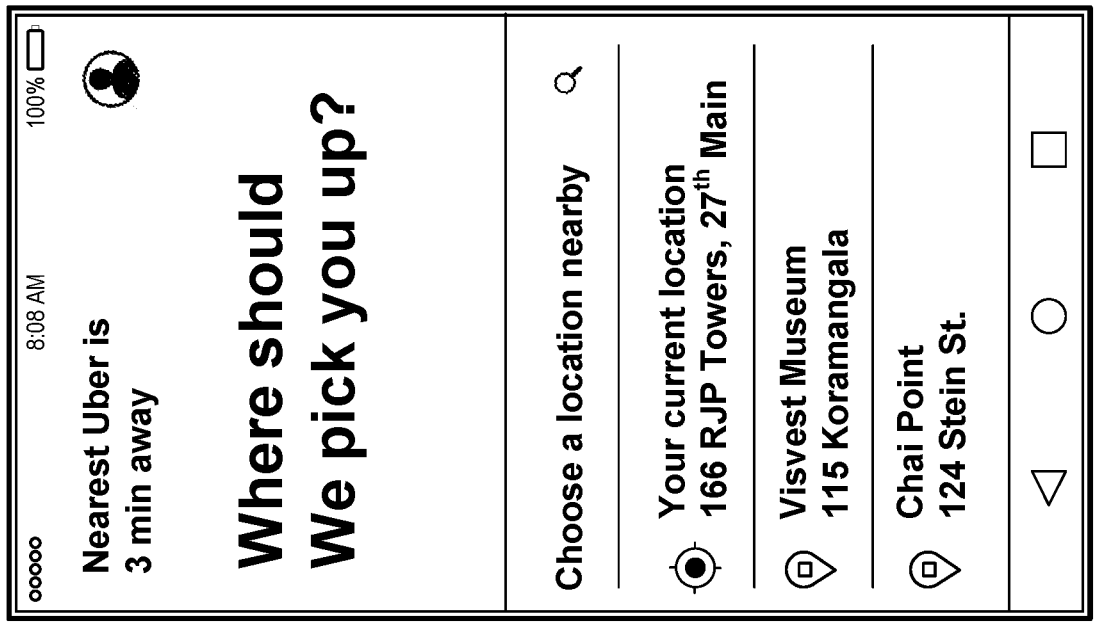
Figure 3A:
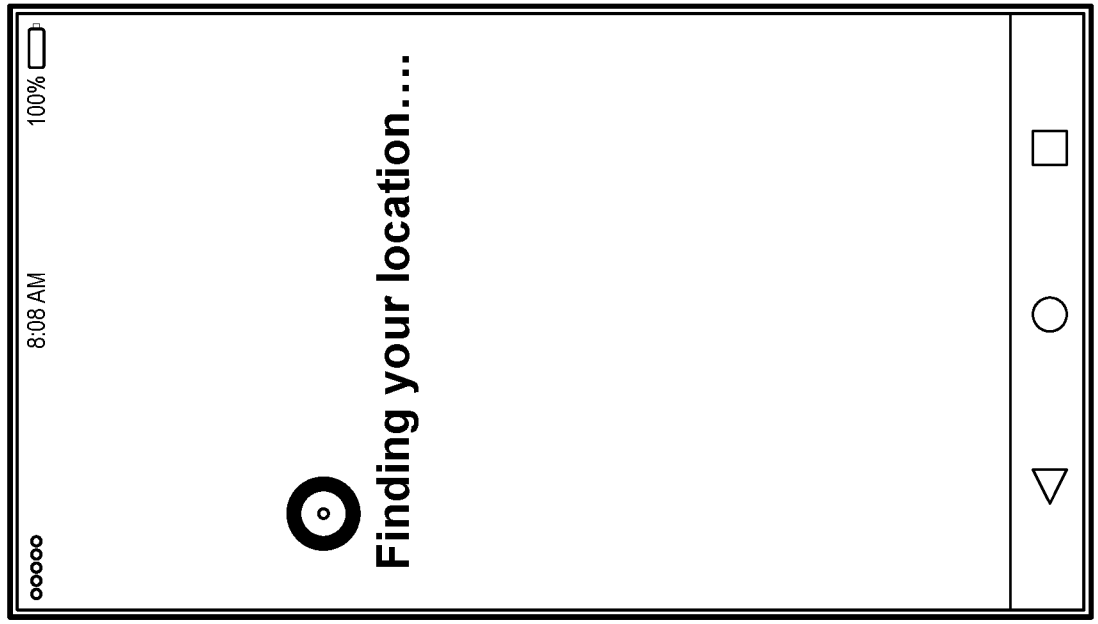

FIG. 3A to FIG. 3H are screenshots of example user interfaces illustrating, on a requester device 106*a*, a core flow for coordinating a transportation service. The user interfaces enable a service requester to arrange for a transportation service using taps instead of requiring the user to type in information such as a pickup point or destination. The user interfaces also restrict use of maps in order to save on data costs, bandwidth, and power consumption. Referring to FIG. 3A, an initial user interface is presented when the service requester activates or launches the client application 108 on the requester device 106*a*. In example embodiments, upon launching the client application 108, a location of the requester device 106*a* is detected.

Once the location is detected, a pickup point user interface (pickup point UI) is displayed on the requester device 106*a* as illustrated in FIG. 3B. The pickup point UI of FIG. 3B displays the detected location of the service requester and suggests one or more pickup points based on the detected location of the requester device 106*a*. As such, the service requester is immediately shown a user interface that starts the transportation service request without requiring the service requester to select an option to request the transportation service or manually enter their location. The user interface of FIG. 3B shows a medium accuracy embodiment where the network system 102 may not know exactly where the service requester is and identifies nearby potential pickup points (e.g., pickup or drop-off locations based on other service requesters) from which the service requester can select.

Figure 3D:
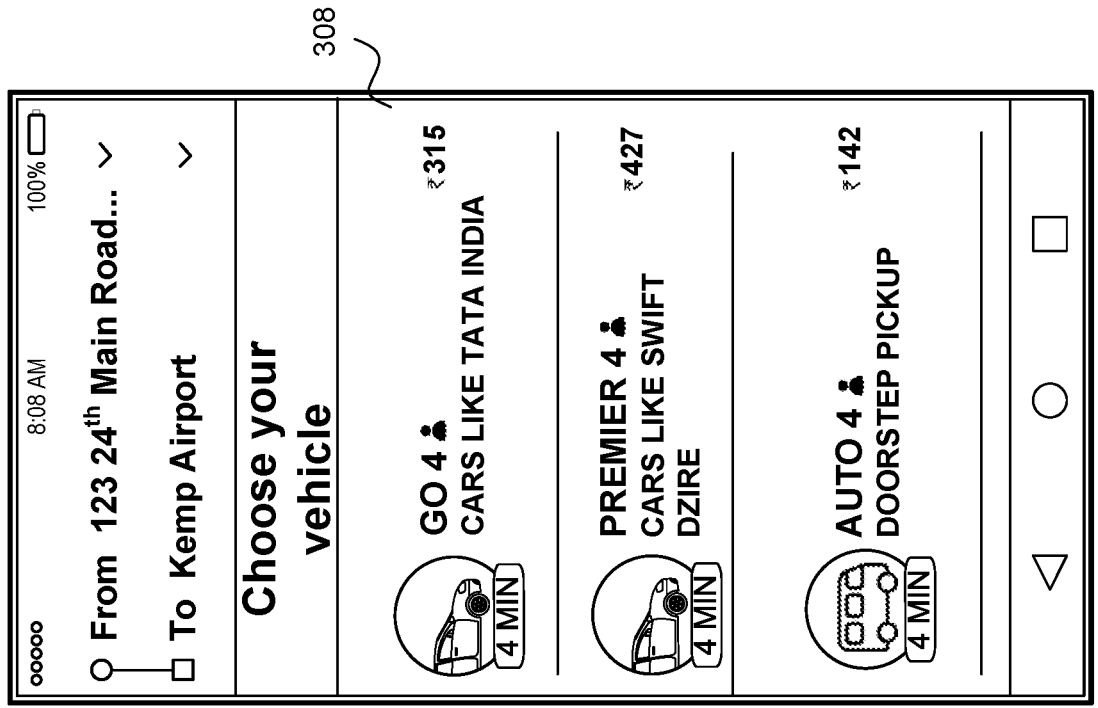
Figure 3C:
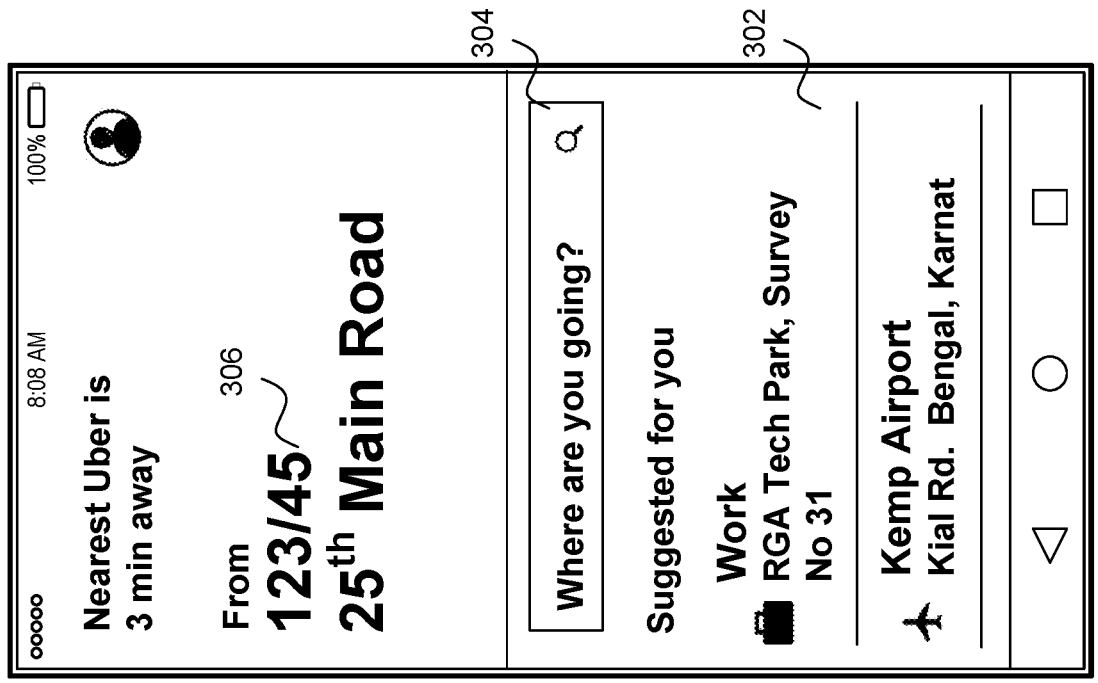

Once a pickup point is confirmed, a destination user interface (destination UI), as shown in FIG. 3C, is presented on the requester device 106*a*. The destination UI provides a (vertical) scrollable list 302 of destinations that enables the service requester to easily request a transportation service. The destinations may be arranged chronologically (based on previous transportation service requests by the service requester). Additionally or alternatively, top destinations in an area (e.g., a city) may be presented. These top destinations may be cached on the requester device 106*a* so they are available when the requester device 106*a* is offline. The service requester can also manually enter a destination in a field 304 if their destination is not shown or the service requester does not want to scroll through the list.

In a very high accuracy embodiment, the initial user interface (e.g., home screen upon launch of the application 108) may be a version of the user interface of FIG. 3C. Specifically, the detected location of the requester device 106*a* is automatically selected as the pickup point 306 and the service requester starts the request by selecting their destination. As such, the UI module 204 can provide the user interface of FIG. 3C automatically to initiate the transportation service request.

In response to the selection of the destination, a vehicle category user interface (vehicle category UI) is presented on the requester device 106*a*. FIG. 3D illustrates one example of the vehicle selection UI. As shown, the vehicle selection UI provides a list of vehicle categories 308 (e.g., available vehicle types) from which the service requester selects. The list may be scrollable (e.g., vertically scrollable) if more vehicle categories 308 are available than can be displayed on a single screen. Each vehicle category provides an indication of a number of passengers the vehicle can carry, a vehicle preview (e.g., a make and model of top vehicles within the vehicle category), an estimated time of arrival of a vehicle of that category to the pickup point, and a corresponding transportation service fee for the vehicle type. In some embodiments, the vehicle category is ordered from least expensive to most expensive or vice-versa. A vehicle indicated in the vehicle preview is not necessarily the vehicle the service requester will get, but rather an example of what the service requester may get (e.g., the most popular vehicle for that level of product/service).

Referring now to FIG. 3E, an example confirmation user interface (confirmation UI) is shown. In response to the selection of a vehicle category from the vehicle selection UI, the confirmation UI is presented that allows the user to confirm the ride request. The confirmation UI summarizes the ride request including the confirmed pickup point, the selected destination, the selected vehicle category, and a corresponding transportation service fee. The confirmation user interface may also provide an option for payment (e.g., pay cash, transfer money, charge credit card). The service requester submits/confirms the ride request by tapping on a request ride icon 310.

In response to confirming the ride request, a service provider arrival user interface (service provider arrival UI) is presented to the service requester. FIG. 3F illustrates one example of the service provider arrival UI. The service provider arrival UI provides an estimated time of arrival of the service provider at the confirmed pickup point and graphically illustrates, on a progress bar 312, progress of a vehicle of the service provider to the confirmed pickup location. A first symbol 314 (e.g., circle) represents the service provider and a second symbol 316 represents the pickup point (or location of the service requester) on the progress bar 312. The service provider arrival UI also includes details of the vehicle such as a license plate number, make and model of the vehicle, and a driver/service provider of the vehicle. The service requester can share status of their trip by selecting a share status icon 318. The service requester can also contact the driver by selecting a contact icon 320. In other embodiments, an icon or option is provided to text the driver. This text option can be in addition to or instead of the contact icon 320.

Figure 3G:
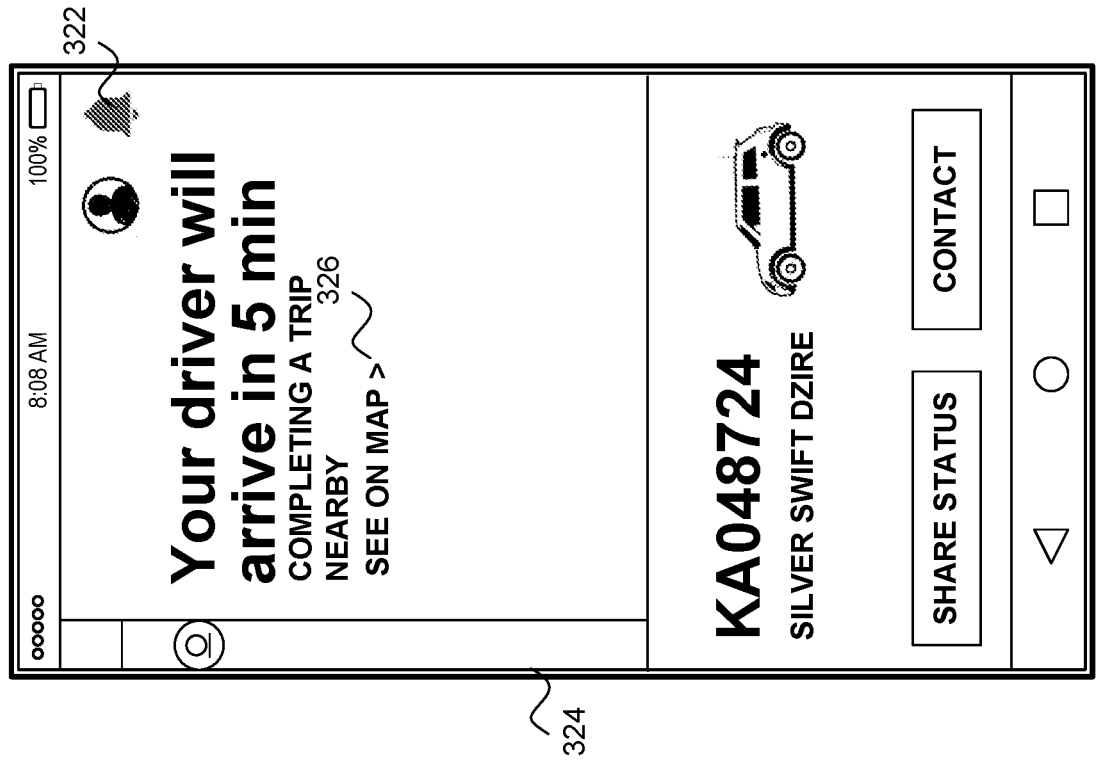

FIG. 3G shows the service provider arrival UI scrolled up to display further information. The further information can include the transportation service fee, how the service fee will be paid (e.g., cash at the end of the trip), and the pickup point and destination.

Figure 3H:
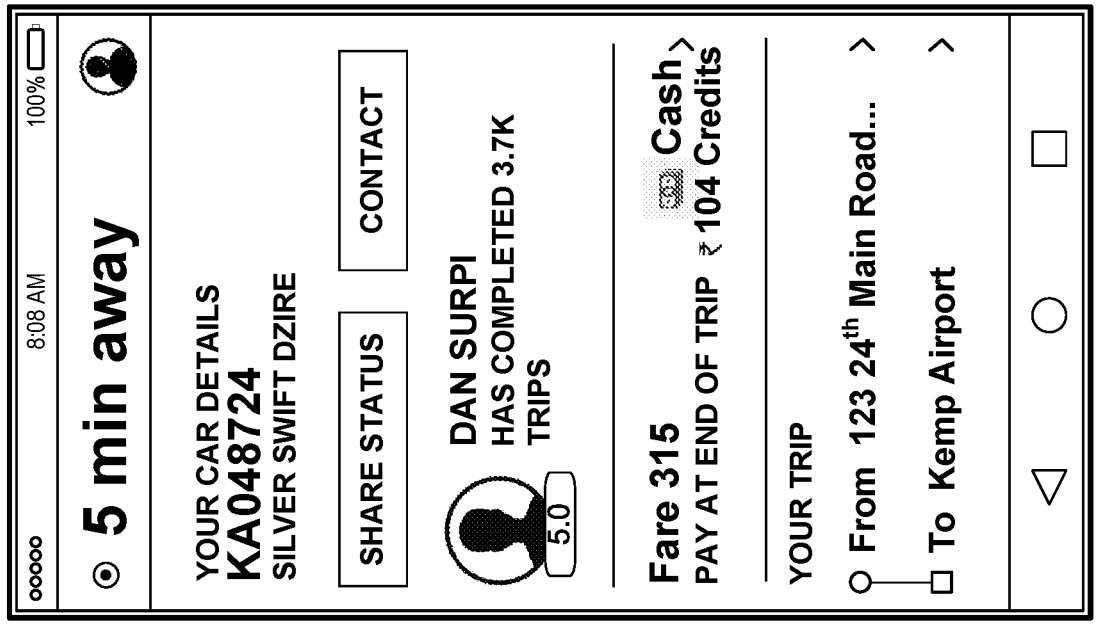

FIG. 3H shows an alternative service provider arrival UI. In this embodiment, a notification icon 322 is provided. Selection of the notification icon 322 triggers display of a user interface that presents actionable alerts and communications from the network system 102. The alternative service provider arrival UI also illustrates an alternative progress bar 324 and provides a map option 326. The map option 326 triggers a display of a map that shows where the vehicle of the service provider is on the map in relations to the pickup point. Further still, the alternative arrival UI can show information such as pool notifications (e.g., "The driver has picked up another rider and will be arriving no later than time."), waiting charges (e.g., "The driver has arrived and is waiting. Get in now to avoid waiting charges of $XX/min."), a ticking countdown timer of wait time before optimum driver match is found (e.g., "Looking for nearby driver, wait X mins."), and/or number of stops along the way before or after the driver picks the rider up and the order in which the rider will be dropped off.

Figure 3I:
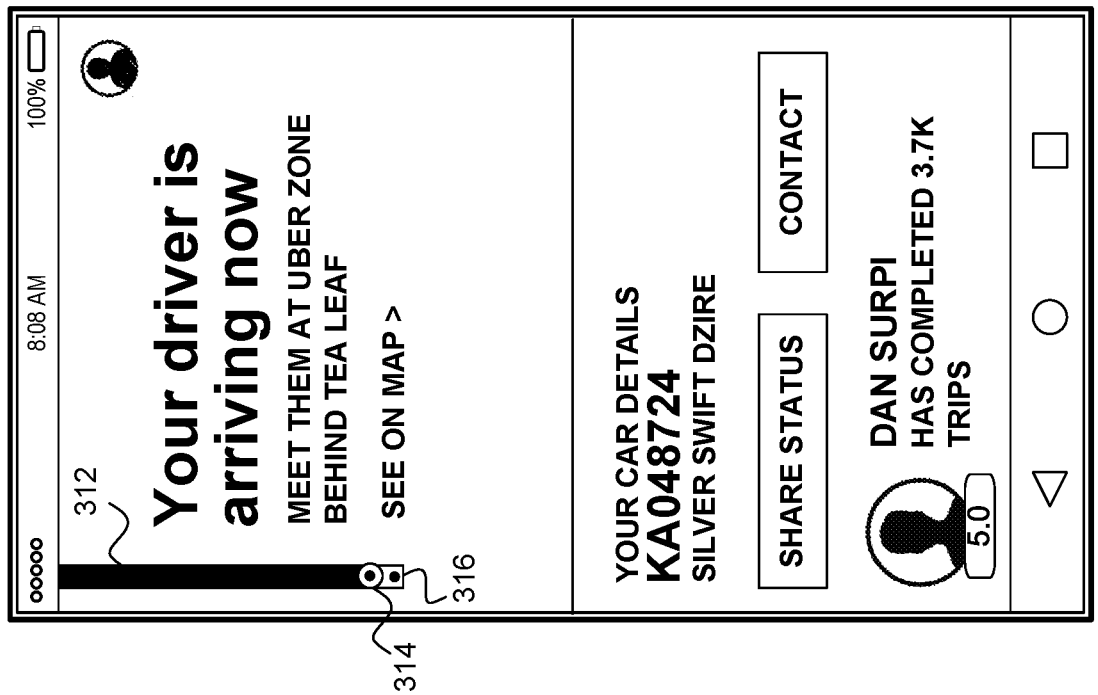
FIG. 3I to FIG. 3K are screenshots of user interfaces illustrating a continuation of the core flow and displaying a progress bar, in accordance with one embodiment.
Figure 3J:
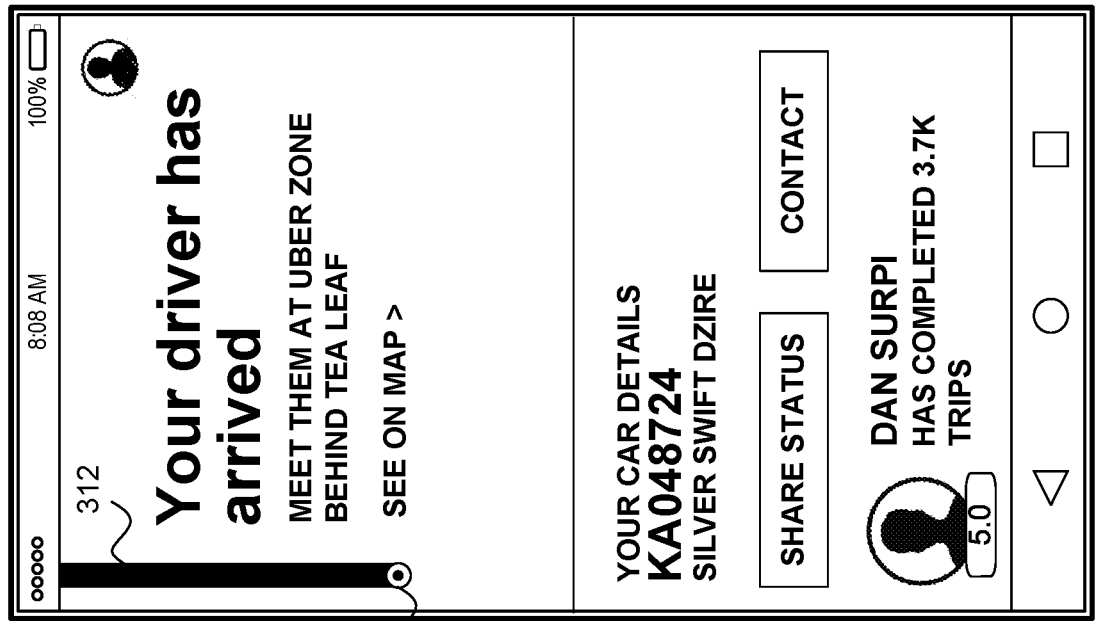

Referring now to FIG. 3I, the service provider arrival UI shows that the service provider (driver) is now arriving (based on the service provider arrival UI embodiment of FIG. 3G). Here, the progress bar 312 is updated to illustrate that the service provider is arriving at the pickup point (e.g., the service requester location). In some embodiments, the service provider arrival UI provides more detailed pickup information. For example, the pickup point is the Tea Leaf Café and the more detailed pickup information indicates to meet the service provider at the Uber Zone behind the Tea Leaf Café, The monitoring, by the monitoring module 218, continues and the service provider arrival UI of FIG. 3J is shown when the service provider arrives at the pickup point. As shown, the progress bar 312 now shows the two symbols 314 and 316 converged.

Figure 3L:
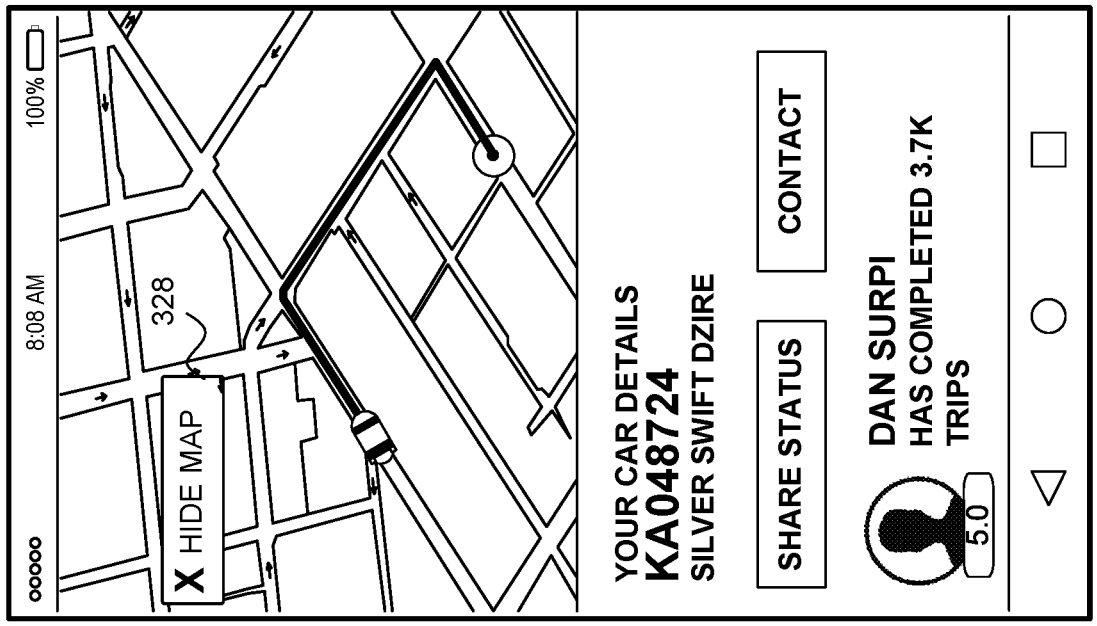
FIG. 3L is a screenshot of a user interface illustrating a map view while en route during the core flow, in accordance with one embodiment.
Figure 3K:
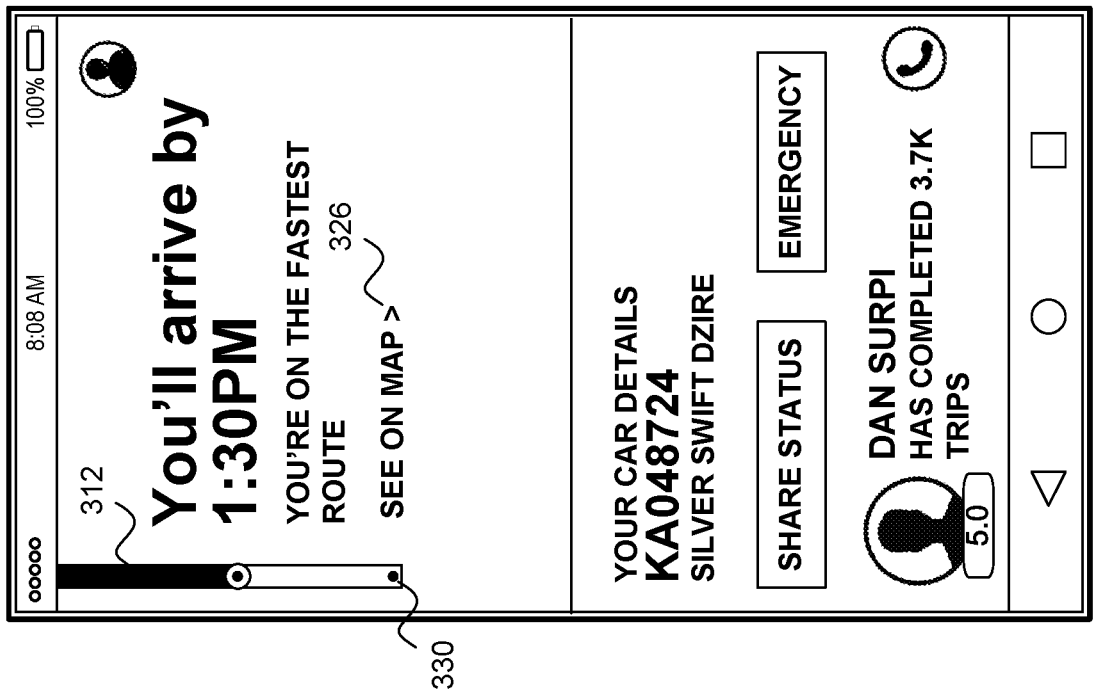

FIG. 3K illustrates an example destination user interface (destination UI). Once the service requester and service provider begin the transportation service to the destination, the destination UI is shown. The destination UI now shows the progress bar 312 illustrating progress of the vehicle to the destination. The service requester has the option 326 to display the map. The service requester may want to display the map in order to confirm their location, confirm their destination, or confirm they are on the correct route.

FIG. 3L shows one example of a map user interface while enroute during the core flow. While viewing the map, the service requester can hide the map by tapping on a hide map icon 328. As such, the service requester can control when maps are displayed if at all in order to control data usage.

The screenshots of FIG. 3F, FIG. 3I to FIG. 3K, and FIG. 4A to FIG. 4B (discussed further below) illustrate various stages of the progress bar 312 on the user interface. The progress bar 312 shows progress of the vehicle to the pickup point (e.g., detect location or location of the service requester) and then to the destination. For example, FIG. 3F presents the progress bar 312 (e.g., shown on the left side of the user interface) when the match is made (e.g., a service requester assigned to the service request). FIG. 3I presents the progress bar 312 as the vehicle of the service provider nears the pickup point. Here, the first symbol 314 (e.g., circle) representing the service provider has advanced towards the second symbol 316 showing progress towards the arrival of the vehicle at the user's location. FIG. 3J presents the progress bar 312 when the vehicle arrives at the pickup point. Here, the progress bar 312 is fully extended to visually indicate that the vehicle (first symbol 314) is at the user's location (second symbol 316). The network system 102 restarts the progress bar 312 once the user is inside the vehicle and is traveling towards the destination as shown in FIG. 3K. Here, the progress bar 312 now show progress towards arrival at the destination (represented by symbol 330).

Figure 4B:
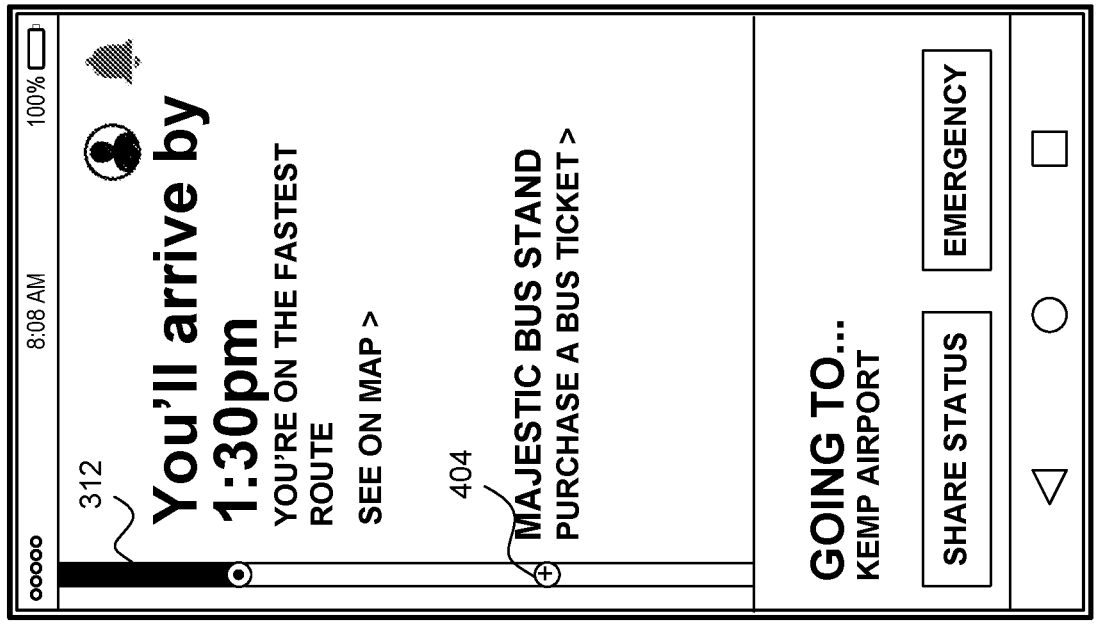
FIG. 4A to FIG. 4B are screenshots of user interfaces illustrating a continuation of the progress bar when enroute, in accordance with one embodiment.
Figure 4A:
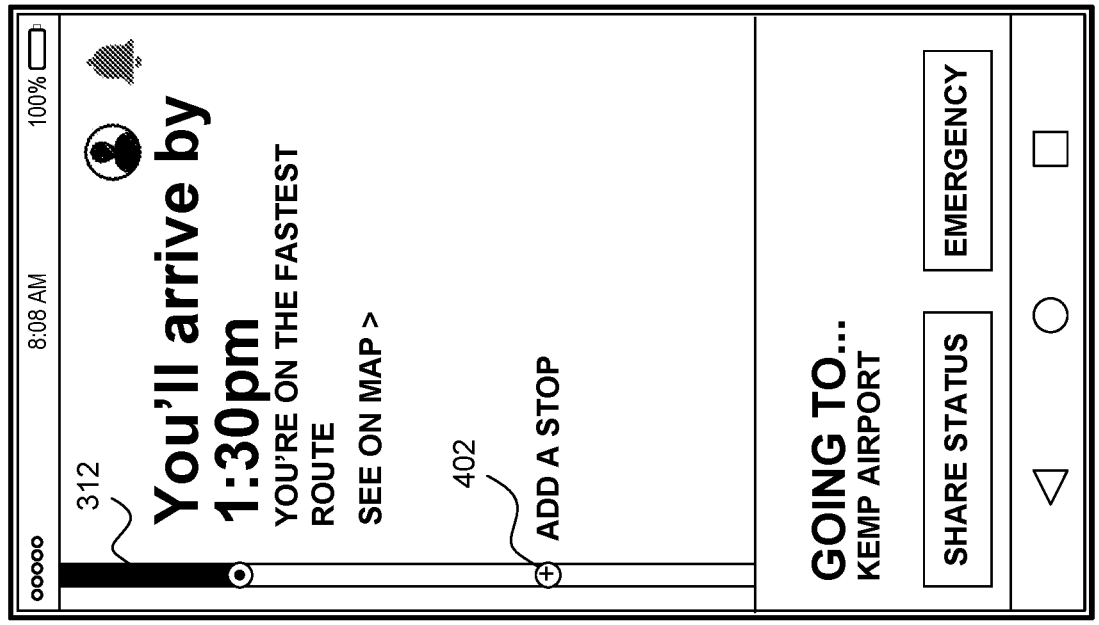

FIG. 4A to FIG. 4B are screenshots of user interfaces illustrating a continuation of the progress bar 312 when enroute to the destination, in accordance with one embodiment. FIG. 4A also includes an add icon 402 to add a stop or to extend a trip that is positioned along the progress bar 312. In some embodiments, the add icon 402 may be positioned at or near the pickup point or destination (e.g., drop-off location).

Referring to FIG. 4B, an action icon 404 is included along the progress bar 312. The action icon 404, when selected by the service requester, causes an action to occur. In the example of FIG. 4B, the action icon 404 triggers a process to purchase a bus ticket. For example, if the service requester selects a bus category during the vehicle selection process, the service requester will need to acquire a ticket to board the bus. As such, the action icon 404 triggers the purchase of the bus ticket.

FIG. 5A to FIG. 5E are screenshots illustrating various pickup user interfaces based on an accuracy level of the detected location of the service requester (e.g., a detected location of requester device 106a). The network system 102 can vary a pickup point flow/experience (e.g., pickup point user interface) based on accuracy of the detected location (e.g., based on GPS signal strength, accuracy, confidence) and other factors. Each of the embodiments illustrated in FIG. 5A to FIG. 5E may be associated with a threshold. The thresholds may be based on GPS signal strength, accuracy, and/or confidence. In example embodiments, the information used to determine accuracy is accessed from the requester device 106a (e.g., smartphone).

Figure 5B:
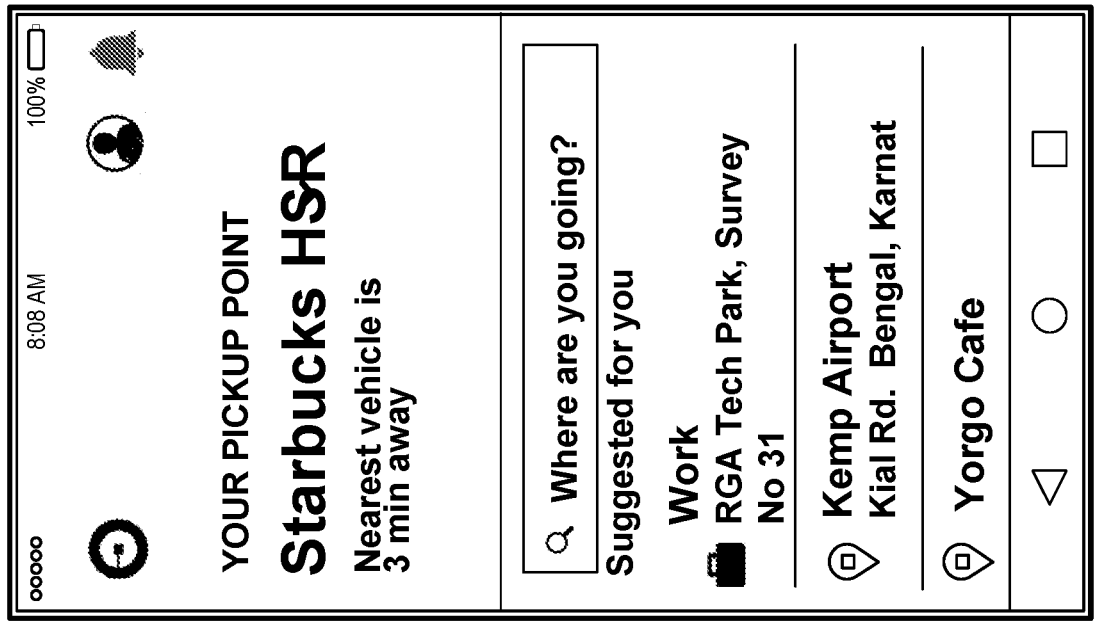
FIG. 5A to FIG. 5E are screenshots illustrating various pickup point user interfaces based on accuracy of a detected location of a device of a user.
Figure 5A:
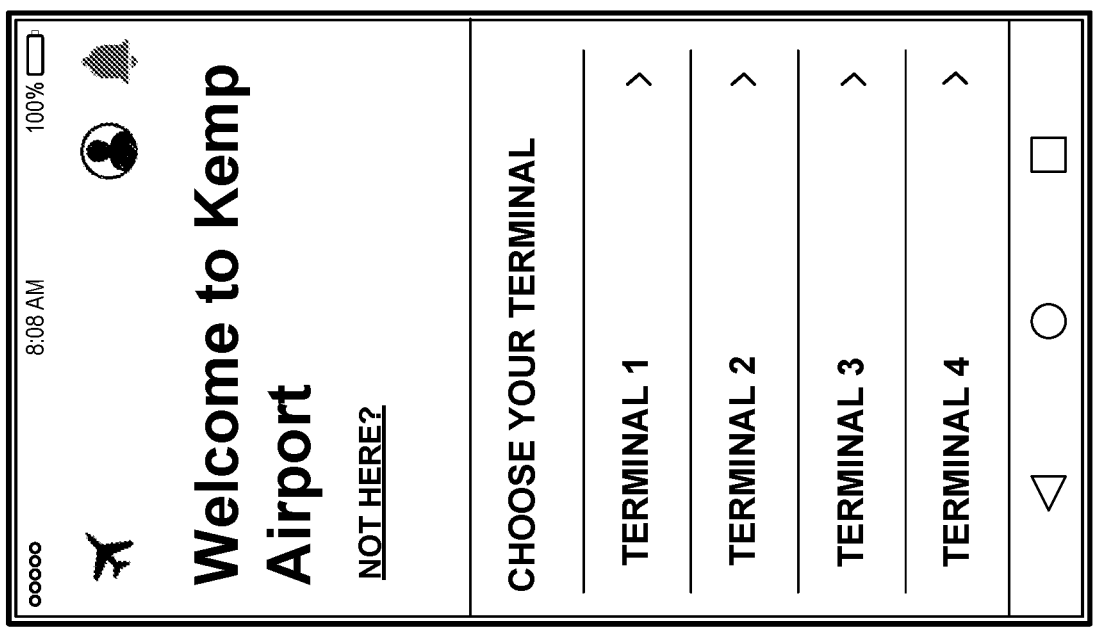

FIG. 5A is a screenshot illustrating a pickup user interface based on a very high accuracy level of the detected location. The very high accuracy level pickup user interface is displayed if the detected location indicates that the service requester is within a predefined geofence associated with a location, point of interest (POI), or venue, or if the service requester is near (e.g., within a predetermined distance) a predefined pick up or drop off zone. In this embodiment, the network system 102 shows the service requester a welcome screen identifying that location, POI, or venue, as the pickup point (e.g., Kemp Airport). The screen may also show associated pickup locations within the pickup point that may be based on a structured list of dedicated, predefined, or popular (e.g., hotspot) pickup locations associated with the pickup point. For example, if the detected location shows with very high accuracy that the service requester is within a geofence for Kemp Airport, the network system 102 (e.g., location module 212) identifies Kemp Airport as the pickup point and determines and displays associated pickup locations for different parts of the Kemp Airport (e.g., asking the service requester to choose an airport terminal and then showing pickup locations for that terminal). The network system 102 shows these pickup locations as textual labels. After the service requester selects a pickup location, the network system 102 proceeds to a different user interface that allows the user to search for, specify, or select their destination location.

FIG. 5B is a screenshot illustrating a pickup user interface based on a high accuracy level of the detected location. The high accuracy level pickup user interface is displayed if the service requester is visiting a place they have previously been picked up from or dropped off at (e.g., based on stored trip data in the data storage 210). The high accuracy level pickup user interface may also be displayed in a case where the network system 102 knows the detected location to a high accuracy, but the network system 102 does not have structured information regarding dedicated, predefined, or popular (e.g., hotspot) pickup points associated with the user's location. For example, the user may be located at a residence or a smaller store, and the residence or smaller store is chosen as the pickup point (e.g., Starbucks HSR). In some embodiments, the network system 102 may indicate the pickup point and immediately allow the user to search for or specify their destination location (e.g., in a search field) or select from a list of suggested destinations (e.g., locations the service requester has been pickup from or dropped off at, popular locations). In these embodiments, selection of the destination is an implicit confirmation of the pickup point identified by the network system 102.

Figure 5C:
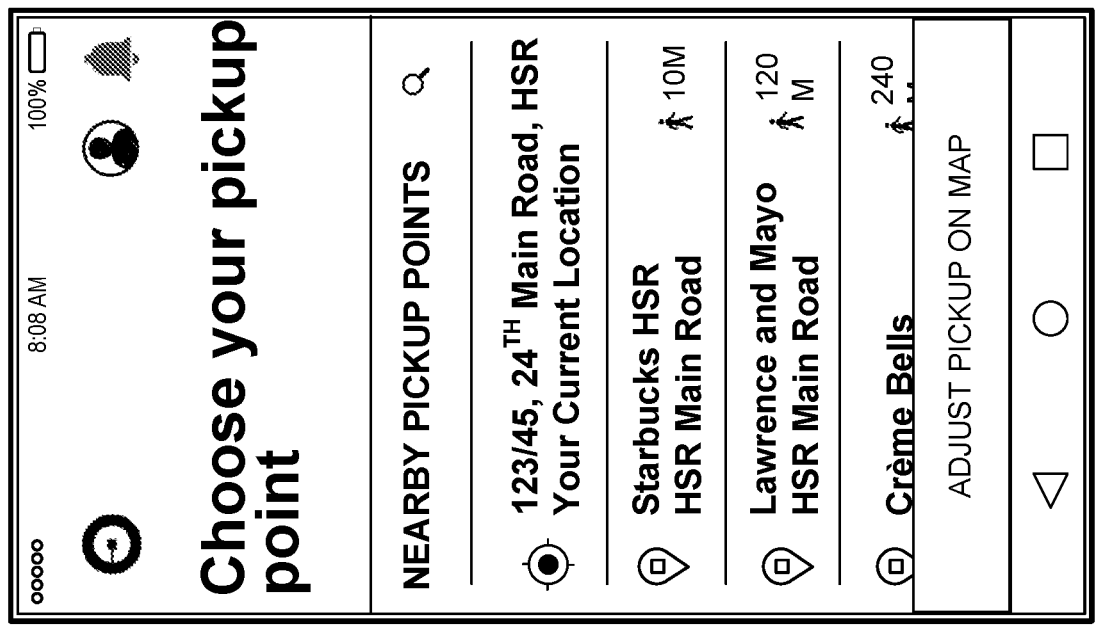

FIG. 5C is a screenshot illustrating a pickup user interface based on a medium accuracy level of the detected location. The medium accuracy level pickup user interface is displayed if the network system 102 does not know exactly where the service requester is located (e.g., because GPS accuracy is low, WiFi is turned off, or there are competing POI matches for POIs where the service requester may be located) but the detected location is accurate to below a predetermined distance threshold (e.g., within 150 meters). In this embodiment, a rough address of the detected location is displayed to the service requester (e.g., current location at 123/45, 24$^{th}$ Main Road) and the service requester is asked to choose or confirm the pickup point. Thus, the network system 102 presents a list of nearby candidate pickup points and asks the service requester to select their preferred pickup point. In some embodiments, the candidate pickup points may be points of interests (POIs) from a POI database. In some embodiments, the nearby candidate pickup point or POI the network system 102 presents may be a venue (e.g., shopping mall, transit center) with multiple associated pickup points (e.g., assuming a structured list of pickup points associated with this venue exists). Thus, the list of nearby candidate pickup points may have multiple levels, such that if the service requester clicks on a POI, a sub-list of associated pickup points is displayed from which the service requester to selects. The list of nearby candidate pickup points of POIs may be updated automatically, in real-time, as the service requester moves. After the service requester selects a pickup point, the network system 102 proceeds to a different user interface that allows the service requester to search for, specify, or select their destination location.

Figure 5D:
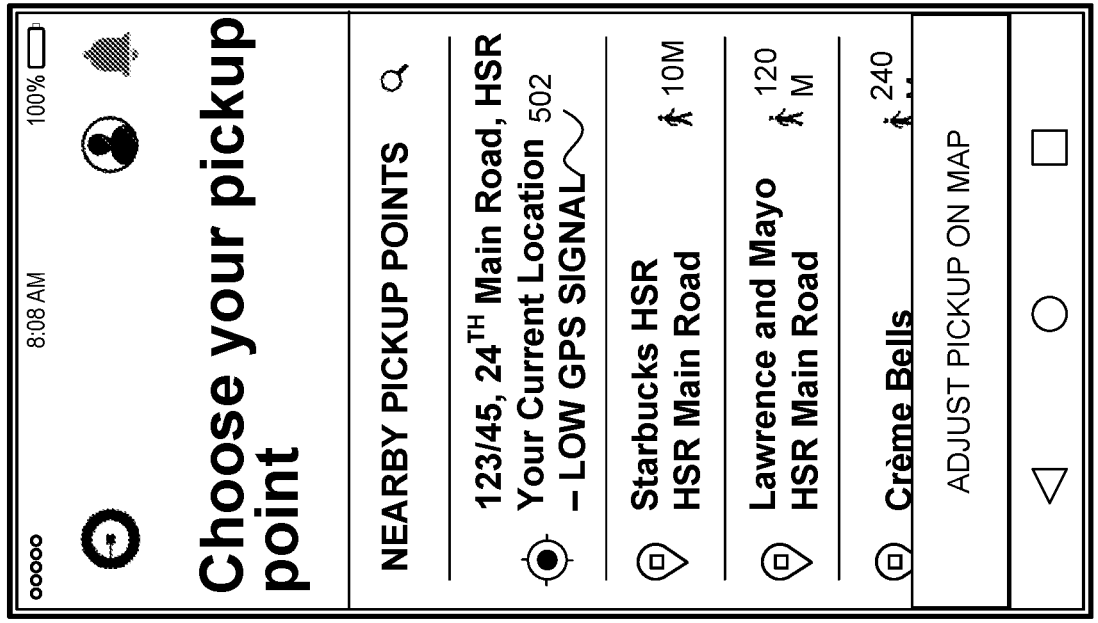

FIG. 5D is a screenshot illustrating a pickup user interface based on a low accuracy level of the detected location. A low accuracy level results from a detected location that is accurate to or above a predetermined distance threshold (e.g., accurate to 150 meters and above). The low accuracy level pickup user interface is similar to the medium accuracy embodiment, however the network system 102 provides a notification 502 indicating that the service requester's GPS/location accuracy is low. The notification serves to set expectations for the service requester that the pickup locations/POIs being shown may be inaccurate (e.g., may be far away from the user's actual location). The suggested pickup locations/POIs can serve as a suggestion, recommendation, or call to action for the service requester to change the user's GPS accuracy if possible (e.g., turn on sensors; turn on GPS, WiFi, cellular data, geolocation services; exit airplane mode). After the service requester selects a pickup point, the network system 102 proceeds to a different user interface that allows the service requester to search for, specify, or select their destination location.

Figure 5E:
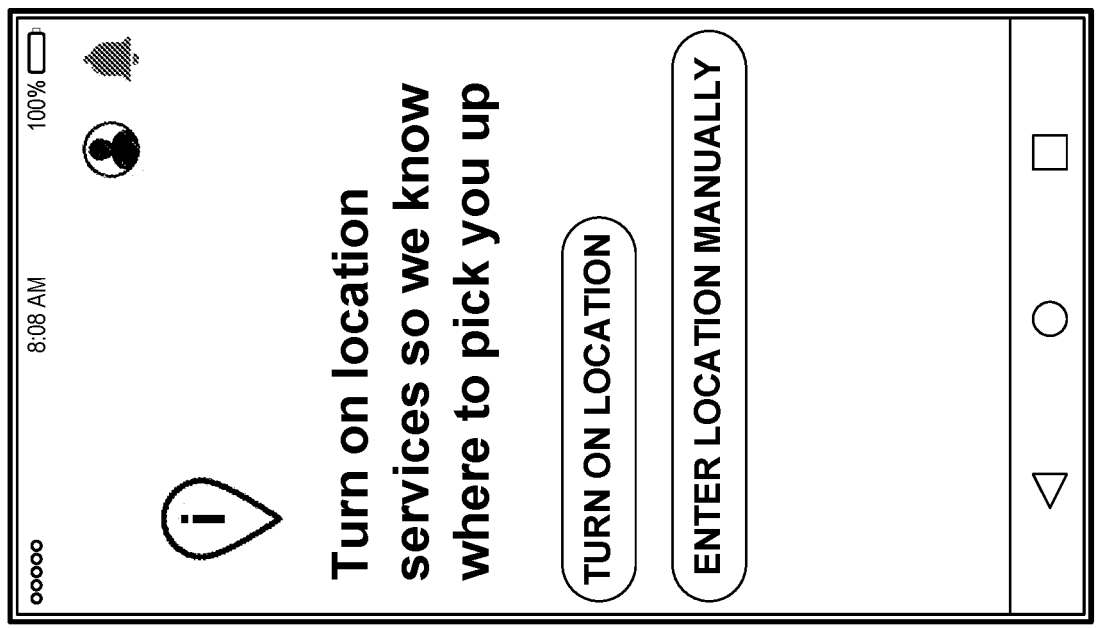

FIG. 5E is a screenshot illustrating a pickup user interface based on a no accuracy level determination for the detected location. The embodiment of FIG. 5E may occur if GPS/location sensors are turned off for example. In example embodiments, the network system 102 provides an explicit call to action for the service requester to turn on sensors; turn on GPS, WiFi, cellular data, geolocation services; or exit airplane mode. In some embodiments, the network system 102 does not provide any pickup selection functionality until the user turns on sensors; turns on GPS, WiFi, cellular data, geolocation services; or exits airplane mode. In other embodiments, the network system 102 allows the service requester to specify their location manually (e.g., by specifying a street address). After the service requester selects/specifies a pickup point, the network system 102 proceeds to a different user interface that allows the service requester to specify or select their destination location.

It is noted that, in the embodiments shown in FIGS. 5A-5D and discussed throughout, the potential pickup points are identified not by address but by a point of interest name. That is, the potential pickup points are names of venues, stores, buildings, restaurants, or other landmarks that are identifiable based on, for example, signage. In some embodiments, a general location of the potential pickup point can be provided with the pickup point name. For example, the area and road the pickup point is on can be provided. By using point of interests instead of addresses, a service requester can easily initiate a transportation service request when they are unfamiliar with an area or do not know addresses but can easily identified landmarks around them.

Figure 6:
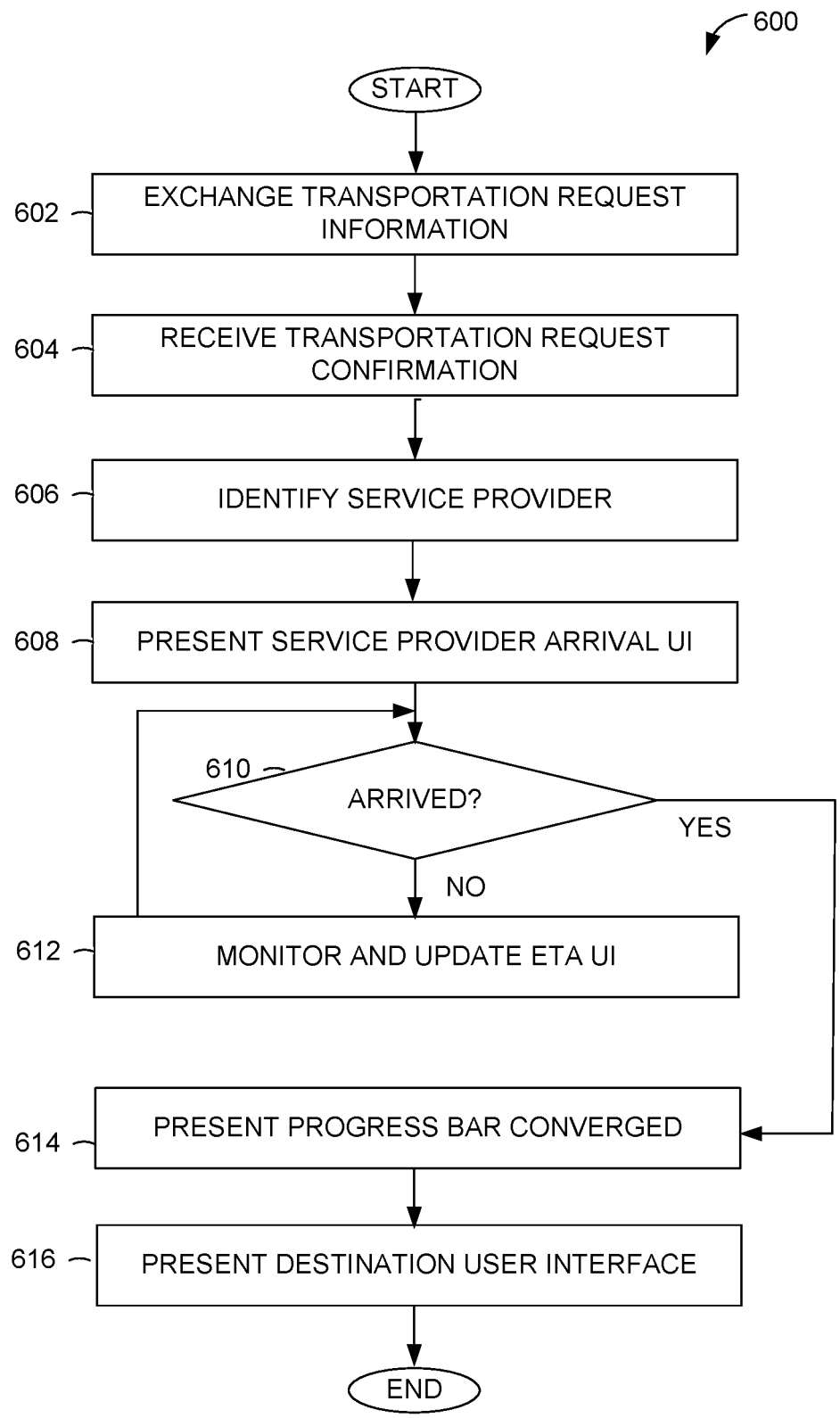
FIG. 6 is a flowchart of a method for managing a ride request, in accordance with one embodiment.

FIG. 6 is a flowchart of a method 600 for managing a transportation request, in accordance with one embodiment. Operations in the method 600 are performed by the network system 102, using components described above with respect to FIG. 2. Accordingly, the method 600 is described by way of example with reference to the network system 102. However, it shall be appreciated that at least some of the operations of the method 600 may be deployed on various other hardware configurations or be performed by similar components residing elsewhere in the network environment 100 such as at the client application 108 at the requester device 106a. Therefore, the method 600 is not intended to be limited to the network system 102.

In operation 602, transportation request information is exchanged between the network system 102 and the requester device 106a. The transportation request information presented by the network system 102 can include user interfaces (e.g., provided by the UI module 204) for selecting/confirming a pickup point, selecting a destination, selecting a vehicle category. In response, the requester device 106a provides the selections of the pickup point, destination, and vehicle category. Operation 602 will be discussed in more detail in connection with FIG. 7 below.

In operation 604, the network system 102 receives the transportation request confirmation. Once the service requester has selected or confirmed the pickup point, destination, and vehicle category, the UI module 204 causes presentation of the confirmation UI. The confirmation UI summarizes the transportation request including the confirmed pickup point, the selected destination, the selected product category, and a corresponding transportation service fee. The confirmation UI also allows the service requester to confirm the transportation request by tapping on, for example, a request ride icon 310 as shown in FIG. 3E. The selection of the ride request icon 310 sends a ride request confirmation to the network system 102.

In operation 606, the network system 102 identifies a service provider for the transportation request. In example embodiments, the routing module 216 selects the service provider based on the pickup point, destination, and vehicle category. Specifically, the routing module 216 identifies a matching service provider within a predetermined distance of the service requester that is available to provide the transportation service.

In operation 608, the network system 102 (via the UI module 204 causes presentation of the service provider arrival user interface ("service provider arrival UI"). FIG. 3F illustrates one example of the service provider arrival UI. The service provider arrival UI provides an estimated time of arrival of the service provider at the confirmed pickup point and graphically illustrates, on the progress bar 312, progress of the service provider (first symbol 314) to the pickup point (second symbol 316). The service provider arrival UI also includes details of the vehicle and driver.

A determination is made, in operation 610, as to whether the service provider has arrived at the pickup point. If the service provider has not arrived, then the monitoring module 218 monitors status of the service provider (e.g., location, speed) and the UI module 204 updates the service provider arrival UI in operation 612. The update to the service provider arrival UI includes updating the progress bar 312 to illustrate progress of the service provider to the pickup point and updating the estimated arrival time. Operations 610 and 612 may be repeated until the service provider arrives at the pickup point.

Once the service provider arrives at the pickup point, the user interface module 204 updates the service provider arrival UI to show the first symbol 314 (representing the service provider) converging with the second symbol 316 (representing the pickup point) on the progress bar 312 in operation 614. The service provider arrival UI may also be updated to indicate that the service provider has arrived (e.g., "Your driver has arrived.").

In operation 616, the UI module 204 causes presentation of the destination user interface ("destination UI"). Once the service requester and service provider begin the transportation service to the destination, the destination UI is shown. The destination UI shows the progress bar 312 now illustrating progress of the vehicle to the destination. The destination UI may also include an add icon (add icon 402) on the progress bar 312 to add a stop or to extend a trip. In some embodiments, an action icon (action icon 404) is included along the progress bar 312 that causes an action to occur.

Figure 7:
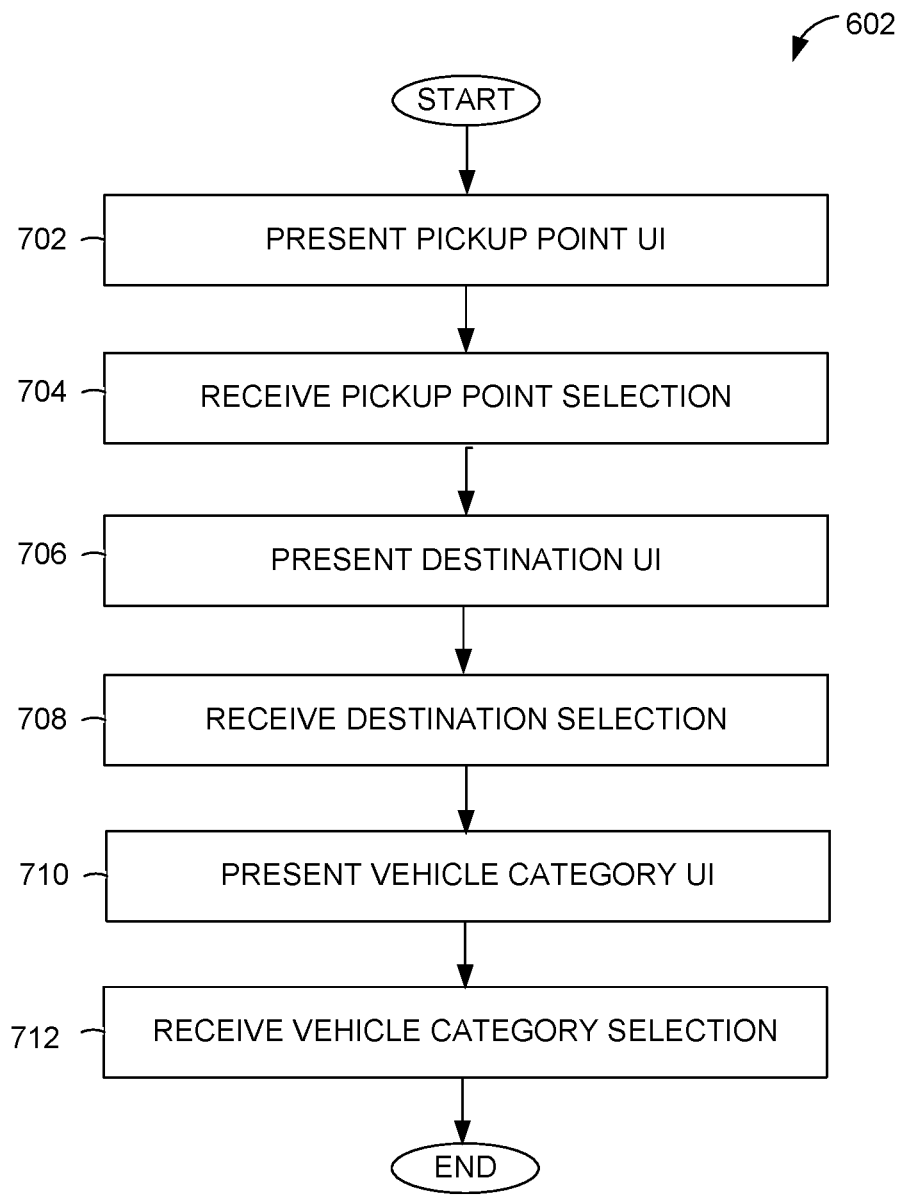
FIG. 7 is a flowchart of a method for presenting ride request user interfaces, in accordance with one embodiment.

FIG. 7 is a flowchart of a method 700 for presenting the transportation request user interfaces, in accordance with one embodiment. Operations in the method 700 are performed by the network system 102, using components described above with respect to FIG. 2, in accordance with some embodiments. Accordingly, the method 700 is described by way of example with reference to the network system 102. However, it shall be appreciated that at least some of the operations of the method 700 may be deployed on various other hardware configurations or be performed by similar components residing elsewhere in the network environment 100 such as at the client application 108 on the requester device 106a. Therefore, the method 700 is not intended to be limited to the network system 102.

In operation 702, the pickup point UI is presented (e.g., by the UI module 204). In example embodiments, once the location of the service requester is detected, the location module 212 determines potential pickup points that are located at or near the detected location of the requester device 106a. In some embodiments, the location module 212 works with the accuracy module 214 to identify the pickup points. In example embodiments, the pickup points comprise landmarks or points of interests (e.g., a restaurant, a store, a venue) rather than addresses. The pickup point UI is displayed on the requester device 106a (e.g., as illustrated in FIG. 3B). The pickup point UI may display the detected location of the service requester and suggests one or more pickup points or locations based on the detected location and an accuracy level. Operation 702 will be discussed in more detail in connection with FIG. 8 below.

In operation 704, the pickup point selection or confirmation is received. For most accuracy level embodiments, the service requester will select a pickup point or location within a pickup point (e.g., a particular terminal at the airport, a floor of a parking garage). Alternatively, the service requester can confirm (if only one pickup point is identified and it is correct) the pickup point.

In operation 706, the destination UI is presented (e.g., by the UI module 204). Once the pickup point is confirmed, a destination UI (e.g., FIG. 3C) is presented on the requester device 106a. The destination UI provides a scrollable list of destinations that enables the service requester to easily select a destination. The destinations may be arranged chronologically (based on previous transportation service requests by the service requester). Additionally or alternatively, top destinations in an area (e.g., a city) may be presented. These top destinations may be cached on the requester device 106a so they are available when the requester device 106a is offline. The service requester can also manually enter a destination if their destination is not shown or the service requester does not want to scroll through the list. As with the pickup points, the destinations can be identified as points of interests (instead of by address). In operation 708, the destination selection is received.

In operation 710, the vehicle category UI is presented (e.g., by the UI module 204). FIG. 3D illustrates one example of the vehicle category UI. The vehicle category UI provides a list of vehicle categories (e.g., available vehicle types) from which the service requester selects. Each vehicle category provides an indication of a number of passengers the vehicle can carry, a vehicle preview (e.g., a make and model of top vehicles within the product category), an estimated time of arrival of a vehicle of that category to the pickup point, and a corresponding transportation service fee for the vehicle type. In operation 712, the vehicle category selection is received.

In some embodiments, the client application 108 running on the user devices (e.g., requester device 106a) is a lightweight application (e.g., requiring five megabytes of memory). Instead of making a connection via the network 104 every time the service requester performs an action (e.g., makes a selection) on the client application 108, the actions are bundled together in order to make fewer calls to the network 104. This results in the client application 108 being significantly less network-heavy. For example, the presentation of the pickup point UI, the destination UI, the vehicle category UI, and/or the confirmation UI may be performed by a user interface module (similar to the UI module 204) of the client application 108. Once all the selections are received from the service requester by the client application 108, the client application 108 sends the bundled selection/confirmation information to the network system 102. As such, in these embodiments, the operations of FIG. 7 are occurring at (network system 102 equivalent components of) the client application 108 on the requester device 106a.

Figure 8:
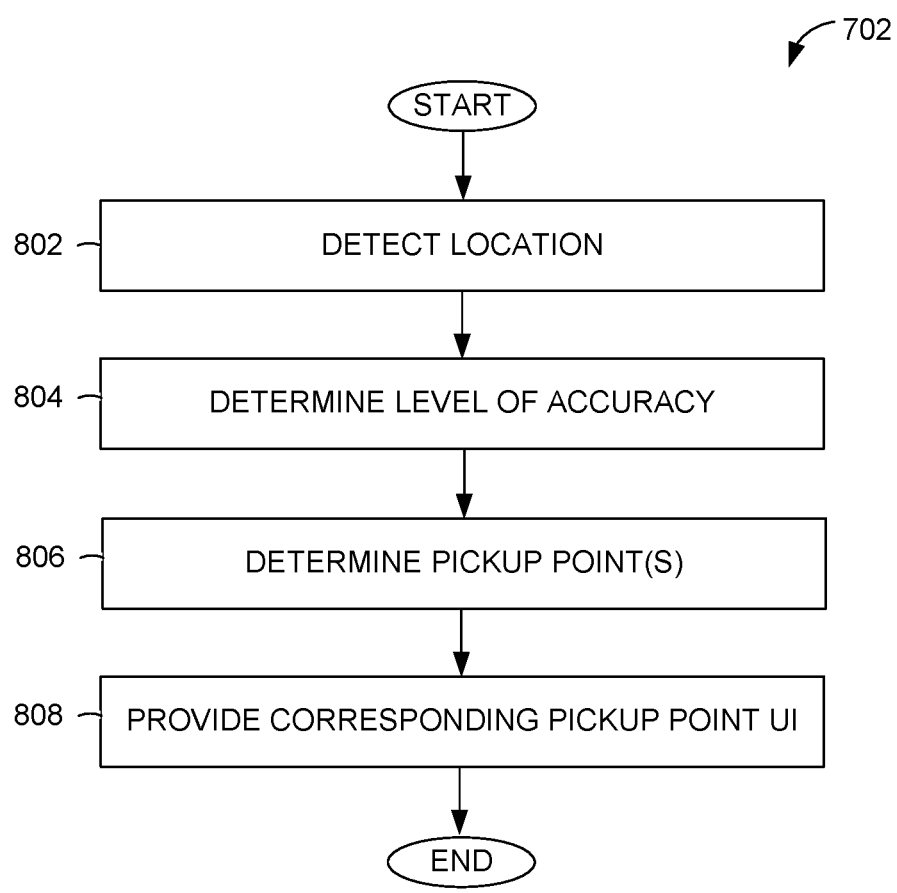
FIG. 8 is a flowchart of a method for presenting a pickup user interface, in accordance with one embodiment.

FIG. 8 is a flowchart of a method 800 for presenting a pickup point user interface, in accordance with one embodiment. Operations in the method 800 are performed by the network system 102, using components described above with respect to FIG. 2. Accordingly, the method 800 is described by way of example with reference to the network system 102. However, it shall be appreciated that at least some of the operations of the method 800 may be deployed on various other hardware configurations or be performed by similar components residing elsewhere in the network environment 100 such as at the client application 108 at the requester device 106a. Therefore, the method 800 is not intended to be limited to the network system 102.

In operation 802, the location of the requester device is detected. In example embodiments, the location module 212 receives location data from the client application 108 of the requester device 106a. The location data may indicate a longitude and latitude of the requester device 106a. Using the location data, the location module 212 attempts to identify the location of the requester device 106a as a point of interest. Alternatively, the location module 212 detects the location in terms of an address.

In operation 804, the accuracy module 214 determines a level of accuracy for the detected location. Each of the accuracy levels may be based on predetermined thresholds based on GPS signal strength, accuracy, or confidence. In some embodiments, the GPS signal strength, accuracy, and/or confidence is determined by the user device 106a and transmitted to (or accessed by) the accuracy module 214. In other embodiments, the GPS signal strength, accuracy, and/or confidence is determined by the accuracy module 214 based on data accessed from the requester device 106a.

In operation 806, one or more pickup point(s) are determined based on the detected location and the level of accuracy. For example, a very high accuracy level (e.g., based on the detected location being within a predefined geofence associated with a location, point of interest, or venue or based on the service requester being near a predefined pickup or drop-off zone) may result in the location module 212 selecting the location, point of interest, or venue that the detected location is within the predefined geofence as the pickup point. Furthermore, the location module 212 may identify specific points within the location, point of interest, or venue as the pickup point (e.g., floors of a garage, terminals at an airport, exits from a venue) given that the network system 102 has a structured list of dedicated, predefined, or popular (e.g., hotspot) pickup points associated with the location, point of interest, or venue. These specific points may be presented as explicit pickup locations at the pickup point.

For a high accuracy level, the network system 102 detects the location to a high accuracy, but the system does not have structured information regarding dedicated, predefined, or popular (e.g., hotspot) pickup points associated with the location. In these embodiments, the location module 212 selects the detected location as the pickup point and/or accesses the data storage 210 to identify (from previous trips) a previous pickup or drop-off location associated with the detected location. The previous pickup or drop-off location may be at or within a predetermined distance of the detected location and selected as the pickup point.

For a medium accuracy level, the location module 212 may not know exactly where the service requester is. In this embodiment, the accuracy module 214 determines that the detected location is accurate to below a predetermined distance threshold (e.g., accurate to within 150 meters). In this embodiment, the location module 212 identifies nearby potential pickup points (e.g., pickup or drop-off locations based on other service requesters) that are within walking distance of the detected location.

For a low accuracy level, the location module 212 may also not know exactly where the service requester is located. In this embodiment, the accuracy module 214 determines that the detected location is accurate to or above a predetermined distance threshold (e.g., accurate to 150 meters or above). In this embodiment, similar to the medium accuracy level embodiment, the location module 212 identifies nearby potential pickup points (e.g., pickup or drop-off locations based on other service requesters) that are within walking distance of the detected location.

In a no accuracy embodiment, the location sensors (e.g., GPS sensors) are turned off or no location data is obtained from the user device 106a. In this embodiment, no pickup point is identified.

In operation 808, the UI module 204 provides the corresponding pickup point UI for display on the requester device 106a. For example, in a very high accuracy level embodiment, the network system 102 shows the service requester a welcome screen identifying that location, POI, or venue, as the pickup point. The screen may also show associated pickup locations within the pickup point. For instance, if the detected location shows with very high accuracy that the service requester is within a geofence of an airport, the network system 102 determines and displays associated pickup locations for different parts of the airport (e.g., terminals, exit doors, dedicated pickup zones). In another example, if the detected location and pickup point is a mall, specific pickup locations within the mall may be presented (e.g., exit doors, parking garage levels, dedicated pickup zones). In example embodiments, the network system 102 shows these pickup locations as textual labels instead of on a map.

For the high accuracy level embodiment, the pickup point UI displays the location, hotspot, or venue located within the geofence of the detected location. However, unlike the very high accuracy level embodiment, there is no structured information regarding dedicated, predefined, or popular (e.g., hotspot) pickup points associated with the detected location. For example, the user may be located at a residence or a smaller store. As such, the pickup point UI shows the residence or smaller store as the pickup point (e.g., without any specific pickup locations associated with the pickup point).

The medium accuracy level embodiment displays a pickup point UI showing a rough address for the detected location and a list of nearby (walking distance to the detected location) candidate pickup points. The pickup point UI asks the service requester to select their preferred pickup point from the list or allows the service requester to search for a pickup point. In some embodiments, the candidate pickup points may be points of interests (POIs) from a POI database. In some embodiments, the nearby candidate pickup point or POI the network system 102 presents may be a venue (e.g., shopping mall, transit center) with multiple associated pickup points (e.g., assuming a structured list of pickup points associated with this venue exists). Thus, the list of nearby candidate pickup points may have multiple levels, such that if the service requester clicks on a POI, a sub-list of associated pickup points is displayed from which the service requester to selects.

The low accuracy level pickup UI is similar to the medium accuracy embodiment, however the network system 102 provides a notification indicating that the service requester's GPS/location accuracy is low. The notification can be presented relative to an indication of the detected location. The suggested pickup locations/POIs on the pickup point UI can serve as a suggestion, recommendation, or call to action for the service requester to change the user's GPS accuracy if possible (e.g., turn on sensors; turn on GPS, WiFI, cellular data, geolocation services; exit airplane mode).

Finally, a no accuracy level embodiment causes presentation of a pickup point UI that explicit requests the service requester to turn on sensors; turn on GPS, WiFi, cellular data, geolocation services; or exit airplane mode. In some embodiments, the network system 102 does not provide any pickup selection functionality until the user turns on sensors; turns on GPS, WiFi, cellular data, geolocation services; or exits airplane mode. In other embodiments, the network system 102 allows the service requester to specify their location manually (e.g., by specifying a street address).

Figure 9:
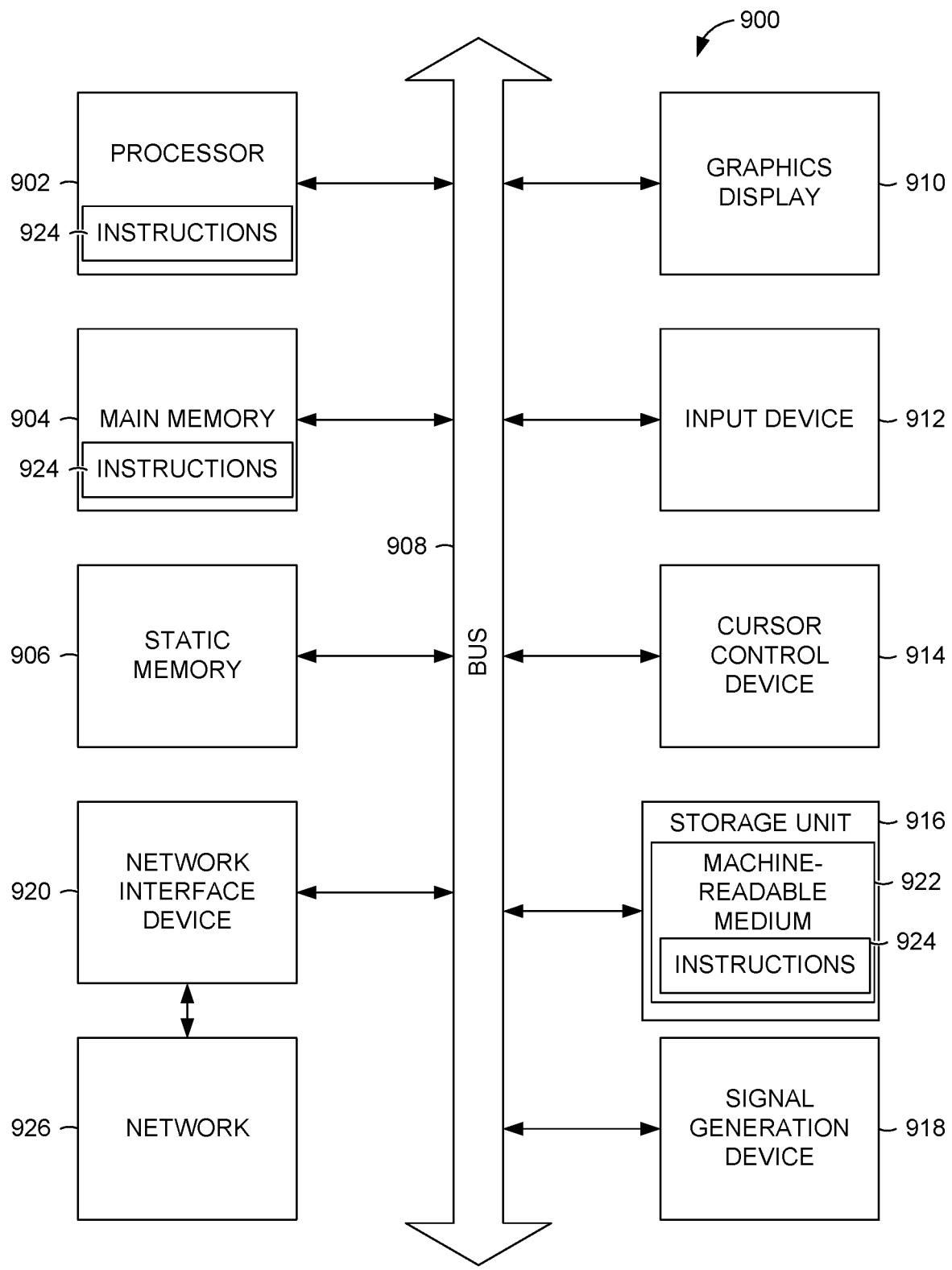
FIG. 9 is a diagrammatic representation of a machine in an example form of a computing system within which a set of instructions may be executed for causing the machine to perform any one or more of the methodologies discussed herein, according to an example embodiment.

FIG. 9 is a block diagram illustrating components of a machine 900, according to some example embodiments, able to read instructions 924 from a machine-storage medium 922 (e.g., a non-transitory machine-storage medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer device (e.g., a computer) within which the instructions 924 (e.g., software, a program, an application, an applet, an app, or other executable code) for causing the machine 900 to perform any one or more of the methodologies discussed herein may be executed, in whole or in part. In example embodiments, the machine 900 may be the edge security apparatus.

The instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. The machine 900 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 900 capable of executing the instructions 924, sequentially or otherwise, that specify actions to be taken by that machine 900. Further, while only a single machine 900 is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, a signal generation device 918 (e.g., a sound card, an amplifier, a speaker, a headphone jack, or any suitable combination thereof), and a network interface device 920.

The storage unit 916 includes the machine-storage medium 922 (e.g., a tangible machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-storage media 922 (e.g., tangible and non-transitory machine-storage media).

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 922 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using a transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 922 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 902 or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   detecting a location of a device of a service requester;
   determining a level of accuracy of the detected location, the level of accuracy being determined from a plurality of levels of accuracy including low, medium, and high;
   responsive to detecting the location of the device of the service requester, automatically determining one or more potential pickup points based on the detected location of the device of the service requester and the level of accuracy, the one or more potential pickup points being points of interests;
   based on the detected location and the level of accuracy, selecting a pickup point user interface (UI) to present to the service requester, each level of accuracy corresponding to a different pickup point user interface;
   causing presentation, on the device of the service requester, of the selected pickup point UI, the selected pickup point UI displaying the one or more potential pickup points without displaying a map, the one or more potential pickup points each being identified by a name of a corresponding point of interest;
   receiving a confirmation of a pickup point from the one or more potential pickup points;
   receiving an indication of a destination; and
   establishing, by a hardware processor, a transportation service based on the confirmed pickup point and the destination.

2. The method of claim 1, wherein the level of accuracy is based on one or more predetermined thresholds associated with a GPS signal strength or an accuracy of the GPS.

3. The method of claim 1, wherein:
   the determining the level of accuracy comprises determining that the device of the service requester is within a predefined geofence corresponding to a specific point of interest; and
   the one or more potential pickup points comprises the specific point of interest.

4. The method of claim 1, wherein:
   the determining the level of accuracy comprises determining that the device of the service requester is within a predefined geofence corresponding to a specific point of interest; and
   the one or more potential pickup points comprises locations within the specific point of interest.

5. The method of claim 1, wherein:
   the determining the level of accuracy comprises determining that the level of accuracy is high and that the device of the service requester is within a predefined distance corresponding to a previous pickup location or drop off location; and
   the one or more potential pickup points comprises the previous pickup location or drop off location.

6. The method of claim 1, wherein:
   the determining the level of accuracy comprises determining that the detected location is accurate to within a predetermined distance threshold; and
   the one or more potential pickup points comprises suggested locations that are within a predetermined distance of the detected location.

7. The method of claim 1, wherein:
   the determining the level of accuracy comprises determining that the detected location is accurate to or above a predetermined distance threshold;
   the one or more potential pickup points comprises suggested locations that are within a predetermined distance of the detected location; and
   the causing presentation of the pickup point UI comprises presenting the one or more potential pickup points and a notification that accuracy is low.

8. The method of claim 1, further comprising:
   detecting that a location sensor is turned off at the device of the service requester; and causing presentation of a further user interface presenting an option to turn on a service corresponding to the location sensor and an option to manually enter the pickup point.

9. The method of claim 1, further comprising:
causing presentation of a service provider arrival user interface (UI) that excludes a map, the service provider arrival UI indicating an estimated time of arrival of a service provider at the confirmed pickup point and graphically illustrating, on a progress bar, progress of a vehicle of the service provider to the confirmed pickup point.

10. The method of claim 1, further comprising:
causing presentation of a destination user interface (UI) that excludes a map, the destination UI indicating an estimated time of arrival at the destination and graphically illustrating, on a progress bar, progress of the service requester to the destination.

11. The method of claim 1, further comprising:
causing presentation of a vehicle category user interface (UI), the vehicle category UI comprising a list of potential vehicles providing the transportation service including potential makes and models and a corresponding service fee.

12. A system comprising:
one or more hardware processors; and
a storage device storing instructions that, when executed by the one or more hardware processors, cause the one or more hardware processors to perform operations comprising:
  detecting a location of a device of a service requester;
  determining a level of accuracy of the detected location, the level of accuracy being determined from a plurality of levels of accuracy including low, medium, and high;
  responsive to detecting the location of the device of the service requester, automatically determining one or more potential pickup points based on the detected location and the level of accuracy, the one or more potential pickup points being points of interests;
  based on the detected location and the level of accuracy, selecting a pickup point user interface (UI) to present to the service requester, each level of accuracy corresponding to a different pickup point user interface;
  causing presentation, on the device of the service requester, of the selected pickup point UI, the selected pickup point UI displaying the one or more potential pickup points without displaying a map, the one or more potential pickup points each being identified by a name of a corresponding point of interest;
  receiving a confirmation of a pickup point from the one or more potential pickup points;
  receiving an indication of a destination; and
  establishing a transportation service based on the confirmed pickup point and the destination.

13. The system of claim 12, wherein the level of accuracy is based on one or more predetermined thresholds associated with a GPS signal strength or an accuracy of the GPS.

14. The system of claim 12, wherein:
the determining the level of accuracy comprises determining that the device of the service requester is within a predefined geofence corresponding to a specific point of interest; and
the one or more potential pickup points comprises the specific point of interest or locations within the specific point of interest.

15. The system of claim 12, wherein:
the determining the level of accuracy comprises determining that the level of accuracy is high and that the device of the service requester is within a predefined distance corresponding to a previous pickup location or drop off location; and
the one or more potential pickup points comprises the previous pickup location or drop off location.

16. The system of claim 12, wherein:
the determining the level of accuracy comprises determining that the detected location is accurate to within a predetermined distance threshold; and
the one or more potential pickup points comprises suggested locations that are within a predetermined distance of the detected location.

17. The system of claim 12, wherein:
the determining the level of accuracy comprises determining that the detected location is accurate to or above a predetermined distance threshold;
the one or more potential pickup points comprises suggested locations that are within a predetermined distance of the detected location; and
the causing presentation of the pickup point UI comprises presenting the one or more potential pickup points and a notification that accuracy is low.

18. The system of claim 12, wherein the operations further comprise:
causing presentation of a service provider arrival user interface (UI) that excludes a map, the service provider arrival UI indicating an estimated time of arrival of a service provider at the confirmed pickup point and graphically illustrating, on a progress bar, progress of a vehicle of the service provider to the confirmed pickup point.

19. The system of claim 12, wherein the operations further comprise:
causing presentation of a destination user interface (UI) that excludes a map, the destination UI indicating an estimated time of arrival at the destination and graphically illustrating, on a progress bar, progress of the service requester to the destination.

20. A machine storage medium storing instructions that, when executed by one or more hardware processors of a machine, cause the machine to perform operations comprising:
  detecting a location of a device of a service requester;
  determining a level of accuracy of the detected location, the level of accuracy being determined from a plurality of levels of accuracy including low, medium, and high;
  responsive to detecting the location of the device of the service requester, automatically determining one or more potential pickup points based on the detected location and the level of accuracy, the one or more potential pickup points being points of interests;
  based on the detected location and the level of accuracy, selecting a pickup point user interface (UI) to present to the service requester, each level of accuracy corresponding to a different pickup point user interface;
  causing presentation, on the device of the service requester, of the selected pickup point UI, the selected pickup point UI displaying the one or more potential pickup points without displaying a map, the one or more potential pickup points each being identified by a name of a corresponding point of interest;

receiving a confirmation of a pickup point from the one or more potential pickup points;
receiving an indication of a destination; and
establishing a transportation service based on the confirmed pickup point and the destination.

\* \* \* \* \*